US009187603B2

(12) United States Patent
Chen et al.

(10) Patent No.: US 9,187,603 B2
(45) Date of Patent: Nov. 17, 2015

(54) BIO-BASED BRANCHED AND HYPERBRANCHED POLYMERS AND OLIGOMERS

(75) Inventors: Zhigang Chen, Dublin, OH (US); Ren Liu, Wuxi (CN)

(73) Assignee: NDSU Research Foundation, Fargo, ND (US)

( * ) Notice: Subject to any disclaimer, the term of this patent is extended or adjusted under 35 U.S.C. 154(b) by 87 days.

(21) Appl. No.: 13/997,744

(22) PCT Filed: Jan. 6, 2012

(86) PCT No.: PCT/US2012/020493
§ 371 (c)(1),
(2), (4) Date: Sep. 9, 2013

(87) PCT Pub. No.: WO2012/094601
PCT Pub. Date: Jul. 12, 2012

(65) Prior Publication Data
US 2013/0345383 A1  Dec. 26, 2013

Related U.S. Application Data

(60) Provisional application No. 61/430,782, filed on Jan. 7, 2011.

(51) Int. Cl.
C08G 83/00 (2006.01)
C08G 63/91 (2006.01)
C08L 101/00 (2006.01)

(52) U.S. Cl.
CPC ............ *C08G 83/005* (2013.01); *C08G 63/914* (2013.01); *C08L 101/005* (2013.01)

(58) Field of Classification Search
CPC .... C08G 83/005; C08G 83/006; C08G 63/48; C08G 63/914; C08L 101/00
See application file for complete search history.

(56) References Cited

U.S. PATENT DOCUMENTS

| | | | |
|---|---|---|---|
| 2,944,035 A | 7/1960 | Wear | |
| 3,003,980 A | 10/1961 | Hames et al. | |
| 4,272,416 A | 6/1981 | Passalenti et al. | |
| 5,360,880 A | 11/1994 | Pashley et al. | |
| 5,998,565 A * | 12/1999 | de Brabander-van den Berg et al. | 528/176 |
| 6,093,777 A * | 7/2000 | Sorensen et al. | 525/438 |
| 6,133,329 A * | 10/2000 | Shieh et al. | 521/48.5 |
| 6,525,112 B1 | 2/2003 | Bammel | |
| 6,617,418 B1 * | 9/2003 | Magnusson et al. | 528/417 |
| 7,294,665 B1 | 11/2007 | Lim | |
| 7,786,053 B2 * | 8/2010 | Ballard | 507/239 |
| 2002/0095007 A1 | 7/2002 | Larock et al. | |
| 2003/0114342 A1* | 6/2003 | Hall | 510/391 |
| 2004/0030031 A1* | 2/2004 | Martin et al. | 524/502 |
| 2005/0080224 A1* | 4/2005 | Muscat | 528/272 |
| 2005/0131205 A1* | 6/2005 | Hggman et al. | 528/417 |
| 2006/0058415 A1* | 3/2006 | Arthur et al. | 523/116 |
| 2006/0142501 A1* | 6/2006 | Badiger et al. | 525/330.3 |
| 2006/0167186 A1* | 7/2006 | Jonsson et al. | 525/242 |
| 2007/0106046 A1* | 5/2007 | Bruchmann et al. | 528/44 |
| 2008/0045668 A1* | 2/2008 | Eibeck et al. | 525/398 |
| 2008/0064852 A1 | 3/2008 | Ddamulira et al. | |
| 2008/0207871 A1* | 8/2008 | Seiler et al. | 528/361 |
| 2008/0221265 A1* | 9/2008 | Sodergard et al. | 524/599 |
| 2008/0274149 A1* | 11/2008 | Seiler et al. | 424/401 |
| 2009/0275674 A1 | 11/2009 | Tian et al. | |
| 2009/0286940 A1* | 11/2009 | Frings et al. | 525/460 |
| 2010/0152376 A1* | 6/2010 | Wermter | 524/612 |
| 2011/0109076 A1* | 5/2011 | Grosset et al. | 283/57 |
| 2012/0070545 A1* | 3/2012 | Hu et al. | 426/106 |
| 2012/0095112 A1* | 4/2012 | Findlay et al. | 514/772.5 |
| 2012/0202909 A1* | 8/2012 | Chen | 522/18 |
| 2014/0336301 A1* | 11/2014 | Webster et al. | 522/170 |

FOREIGN PATENT DOCUMENTS

| | | |
|---|---|---|
| CN | 1706905 A | 12/2005 |
| CN | 101100578 A | 1/2008 |
| GB | 1043345 | 9/1966 |
| JP | 49106626 A | 10/1974 |
| JP | 49106940 A | 10/1974 |
| JP | 2002194076 A | 7/2002 |
| WO | WO 9317060 A1 | 2/1993 |
| WO | WO 2009/134388 A1 | 11/2009 |

OTHER PUBLICATIONS

Anonymous, "Curable, with cashew nut shell oil modified epoxide resin compositions," Dec. 1986 *Research Disclosure*, RD272033.

Black et al., "Thiolene UV-curable coatings using vegetable oil macromonomers," 2009 *Eur. Polymer J.*, 45:1433-1441.

Cardanol. From Wikipedia, the free encyclopedia. [retrieved on Mar. 2, 2015]. Retrieved from the Internet <URL:http://en.wikipedia.org/wiki/Cardanol> 2 pages.

"Cashew Nut Shell Liquid," Project profile. Available from the Government of India Ministry of Micro, Small & Medium Enterprises (MSME)—Development Institute website. Date unknown [retrieved on Feb. 10, 2015]. Retrieved from the internet at: <eastgodvari.nic.in/MSME/Chemical/cashew%20nut%20shell%20liquid.pdf>; 30 pages.

Chen, "Development of 'sweet,' soy-based, high biorenewable content UV curable coatings," slides presented with a talk given at the *UV&EB 2010 Technology Expo and Conference*. Sponsored by RADTECH (The Associate for UV&EB Technology). Baltimore, MD: May 23-26, 2010. Published in the Winter 2011 *RadTech Report*; 12 pages.

(Continued)

*Primary Examiner* — Liam J Heincer

(74) *Attorney, Agent, or Firm* — Mueting, Raasch & Gebhardt, P.A.

(57) ABSTRACT

Branched and hyperbranched oligomers and polymers that contain a cashew nutshell oil or liquid component are provided. The novel oligomers and polymers are suitable for use as an oil, lubricant, coating, adhesive, resin or composite.

21 Claims, 13 Drawing Sheets

(56) References Cited

OTHER PUBLICATIONS

Chen et al., "Development of 'sweet' soy-based, high biorenewable content UV curable coatings," Proceedings paper, 17 pages. Presented at *The 37th Annual Waterborne Symposium, Advances in Sustainable Coatings Technology Meeting*. New Orleans, LA: Feb. 10-12, 2010.

Chen, "Development of green UV curable coatings and polymer materials," slides presented with a talk given at the *2010 Radtech China Conference*. Beihai, China: Apr. 12, 2010.

Chen et al., "Soy-based, high biorenewable content UV curable coatings," May 2011 *Prog. Organic Coatings*, 71(1):98-109 (published online Feb. 22, 2011).

Chen et al., "Soy-based UV-curable thiol-ene coatings," 2010 *J. Coat. Technol. Res.*, 7(5):603-613 (published online Feb. 24, 2010).

Chen et al., "Study of epoxidized-cardanol containing cationic UV curable materials," Jun. 2009 *Prog. Org. Coatings*, 65(2):246-250.

Chen, "Development of high performance soy-based UV curable coatings," Grant Abstract, United Soybean Board 2010, Retrieved from the Internet on Jul. 8, 2013: http://www.soybeancheckoffresearch.org/DetailsbyPaperid.php?id_Paper=1110.

Chen, "Development of high performance soy-based curable UV coatings," Grant Abstract, United Soybean Board 2011, Retrieved from the Internet on Jul. 8, 2013: http://www.soybeancheckoffresearch.org/DetailsbyPaperid.php?id_Paper=1827.

Chen, "Green soy-based urethane-acrylates (SUAs) for thermoset coatings and composites," Grant Abstract, United Soybean Board 2011, [retrieved on Jul. 8, 2013]. Retrieved from the Internet <URLhttp://www.soybeancheckoffresearch.org/DetailsbyPaperid.php?id_Paper=1922>.

Ciba, "Photoinitiators for UV Curing," Key Products Section Guide; Ciba Specialty Chemicals: Basel, Switzerland. Copyright 2003. 8 pages.

De Espinosa et al., "A new route to acrylate oils: Crosslinking and properties of acrylate triglycerides from high oleic sunflower oil," 2009 *J. Polym. Sci., Part A: Polym. Chem.*, 47(4):1159-1167.

Deng et al., "Ultraviolet curing mechanism of cardanol and properties of cured product," 2007 *J. Functional Polymers*, 19-20(2):193-197.

Hojbari et al., "Functional Thermoplastics from Linear Diols and Diisocyanates Produced Entirely from Renewable Lipid Sources," 2010 *Biomacromolecules*, 11:911-918.

Khot et al., "Development and Application of Triglyceride-Based Polymers and Composites," 2001 *J. Appl. Polym. Sci.*, 82:703-723.

Lu et al., "New Sheet Molding Compound Resins from Soybean Oil. Synthesis and Characterization," 2005 *Polymer*, 46:71-80.

Lu et al. "Soybean-Oil-Based Waterborne Polyurethane Dispersions: Effects of Polyol Functionality and Hard Segment Content on Properties," 2008, *Biomacromolecules*, 9:3332-3340.

Mannari et al., "Novel "Green" UV-curable Oligomers—Leveraging Chemistry for Delivering Value," paper presented at the *RadTech International UV and EB Curing Technology Expo & Conference 2010* (Baltimore, MD: May 23-26, 2010).

Pan et al., "Impact of Structure and Functionality of Core Polyol in Highly Functional Biobased Epoxy Resins," 2011 *Macromol. Rapid. Commun.*, 32(17):1324-1330.

Patel et al., "Novel binder system for ultraviolet-curable coatings based on tobacco seed (*Nicotiana rustica*) oil derivatives as a renewable resource," 2008 *J. Applied Polymer Science*, 107:71-81.

Pathak et al., "Lubricants from cashew nutshell liquid," 1963 *Indian Journal of Technology*, 1(11):433-434.

Pelletier et el., "Acrylated vegetable oils as photocrosslinkable materials," 2006 *J. Applied Polymer Science*, 99(6):3218-3221.

Rojo et al., "Glycodendritic structures: promising new antiviral drugs," 2004 *Journal of Antimicrobial Chemotherapy*, 54(3):579-581.

Samuelsson et al., "Synthesis and polymerization of a radiation curable hyperbranched resin based on epoxy functional fatty acids," 2004 *Progress in Organic Coatings*, 50:193-198.

Wu et al., "Effect of hyperbranched acrylates on UV curable soy-based biorenewable coatings," Apr. 2011 *Polymer International*, 60(4):571-577 (published online Dec. 3, 2010).

Zheng et al., "Cashew nut shell oil epoxy acrylate modified epoxy acrylic UV curable coatings" 2005 *Tuliao Gongye*, 35(12):14-17.

Written Opinion issued on May 3, 2012, for International Application No. PCT/US2012/020493.

International Search report issued on May 3, 2012, for International Application No. PCT/US2012/020493.

International Preliminary Report on Patentability issued on Jul. 10, 2013, for International Application No. PCT/US2012/020493.

* cited by examiner (a)

(b)

(c)

(a)

(b)

| R:(CH$_2$)$_9$CH$_3$ | 4% | | |
|---|---|---|---|
| R:(CH$_2$)$_7$CH$_3$ | 11% | R:(CH$_2$)$_7$CH$_3$ | 3% |
| R:CH=CH(CH$_2$)$_7$CH$_3$ | 24% | R:CH=CH(CH$_2$)$_5$CH$_3$ | 36% |
| R:CH=CHCH$_2$CH=CH(CH$_2$)$_4$CH$_3$ | 54% | R:CH=CHCH$_2$CH=CH(CH$_2$)$_2$CH$_3$ | 20% |
| R:CH=CHCH$_2$CH=CHCH$_2$CH=CHCH$_2$CH$_3$ | 7% | R:CH=CHCH$_2$CH=CHCH$_2$CH=CH$_2$ | 41% |

BIO-BASED BRANCHED AND HYPERBRANCHED POLYMERS AND OLIGOMERS

This application is the §371 U.S. National Stage of International Application No. PCT/US/2012/020493, filed Jan. 6, 2012, which claims the benefit of U.S. Provisional Application Ser. No. 61/430,782, filed Jan. 7, 2011, which are incorporated herein by reference in their entireties its entirety.

BACKGROUND OF THE INVENTION

UV cure technology is a green coating technology characterized by high productivity, low energy consumption and extremely low VOC emission. It is a promising materials fabrication technology that is enjoying fast-pace market expansion.

Natural plant oils have been used to prepare bio-based UV curable materials via various chemical approaches. Acrylated epoxidized soybean oil (known as AESO or ASO) was synthesized via the acrylation of epoxidized soybean oil (Lu et al., Polymer, 2005, 46:71-80; Pelletier et al., J. Applied Polymer Science, 2006, 99:3218-3221) and commercialized by Cytec Industries etc. (Pashley et al., 1994, U.S. Pat. No. 5,360,880). Acrylated sunflower oil has recently been prepared by a new route, which involved an "ene" reaction with singlet oxygen (de Espinosa et al., 2009, J. Polym. Sci., Part A: Polym. Chem., 47:1159-1167). Further development of these bio-based UV curable materials is based on chemical modifications aimed at increasing the $T_g$ and enhancing their performance. For example, AESO can be reacted with maleic acid to increase the carbon-carbon double bonds content, which increases the crosslinking density of the resulting biopolymers; the reaction of AESO with cyclohexane dicarboxylic acid also formed oligomers, which increased the $T_g$ of resulting biopolymers by introducing stiff cyclic rings into the structure (Khot et al., 2001, J. Appl. Polym. Sci., 82:703-723). A series of UV-curable oligomers based on allyl, acrylate or vinyl ether functionalized castor oil were synthesized by isocyanate prepolymer process, these biobased oligomers exhibited excellent thin film performance when blended with multifunctional thiols as thiol-ene UV curable formulation (Black and Rawlins, 2009, Eur. Polymer J. 45:1433-1441).

Other than direct modifications of plant oils, the introduction petroleum-based chemicals into plant oil derivatives is another promising approach to increase bio-based UV curable materials performance. For example, UV curable hyperbranched polyether was obtained by transesterification of hyperbranched polyol and epoxy functional methyl vernoleate from crude vegetable oil (Samuelsson et al., 2004, Progress in Organic Coatings 50:193-198). A series of UV-curable urethane acrylates (UV-PUs) based on epoxidized plant oil monoglyceride were prepared by using novel polyols derived from plant oils reacted with isocyanate. UV curable coatings that are based on these UV-PUs show good curing characteristics and potential for high-performance industrial coating applications (Patel et al., 2008, J. Applied Polymer Science 107:71-81; Mannari and Patel, "Novel "Green" UV-curable Oligomers—Leveraging Chemistry for Delivering Value," presented at the RadTech UV and EB Technology Expo & Conference; May 24-26, 2010, Baltimore, Md.). In all these examples, however, the introduction of petroleum-based ingredients led to lower biorenewable content. Coating materials with higher biorenewable content and good performance are highly desired.

SUMMARY OF THE INVENTION

Rising petroleum raw material costs and stricter environmental regulations call for the development of advanced UV curable materials from renewable resources in order for sustainability and reduced carbon foot-prints. Utilization of chemicals derived from renewable materials in solventless, thermal or UV curable coating technology meets the increasing "green" materials demand on the global market, and is a promising "green+green" solution to the stringent environmental regulations. However, only high biorenewable content UV curable materials with lower cost and comparable performance to petrochemical based materials will lead to broad and rapid market acceptance.

The invention provides a class of oligomers/polymers with unique structures and high biorenewable content. These compounds perform better than typical bio-based oligomers such as epoxidized and acrylated vegetable oils. Compared to their petroleum-based counterparts, they possess higher biocontent and, in some cases, similar and even better performance.

In one aspect, the invention provides novel high biorenewable content branched or multi-branched oligomers/polymers based on a plant oil and a cashew nutshell oil or liquid (generally referred to herein as CNSL but also known in the art as CNL) components or derivatives thereof such as cardanol (CL) or epoxidized cardanol (ECL), as well as methods of making said oligomers/polymers. The branched or multi-branched oligomer/polymer contains a plant oil backbone and cashew nutshell oil or liquid derivative grafts, which form the multiple branch chains. For example, the cashew nutshell oil or liquid derivative cardanol (CL) can be grafted onto an epoxidized soybean oil (ESBO) backbone.

In another aspect, the invention provides novel high biorenewable content hyperbranched oligomers/polymers based on cashew nutshell oil or liquid (CNSL) components or derivatives thereof such as cardanol (CL) or epoxidized cardanol (ECL), and a hyperbranched polyol, as well as methods of making said oligomers/polymers. The hyperbranched polyol can be, for example, a polyester polyol or polyether polyol, or any multi-hydroxy functionalized molecule. A hyperbranched polymer is a polymer that is highly branched, and which contains multiple end groups, such as, in the case of a polyol, a multiple hydroxyl end groups. The hyperbranched oligomer/polymer can advantageously have a dendritic structure, i.e., a branching, treelike structure in which chains radiate out from a central atom or cluster of atoms. Boltorn™ H20 and Boltorn™ H30 are examples of dendritic hyperbranched polyester polyols.

In various embodiments, the branched and hyperbranched oligomer/polymer of either aspect of the invention can optionally take the form of a functionalized oligomer/polymer; for example, it may be epoxidized, hydroxylated, acrylated, thiolated, or functionalized with any other functional group, moiety or functionality, particularly one that contains carbon-carbon double bonds, such as allyl or vinyl ether.

In another aspect, the invention provides compositions and formulations that contain the branched or hyperbranched oligomers/polymers of the invention, as well as coatings, films, adhesives, composites, inks and the like formed by curing the branched or hyperbranched oligomers/polymers, compositions, or formulations. The oligomers/polymers of the invention, as well as compositions and formulations containing them, can be cured, for example using UV curing, thermal curing, autooxidation or thiol-mediated curing, to produce thermoset (i.e., cross-linked) polymer materials such as coatings, films, adhesives, composites and the like. Because of the more rigid structure of these novel oligomers/polymers imparted by the cashew nutshell oil or liquid, the cured materials containing these oligomers possess improved or much improved material properties over current bio-based materials and in some cases, even their petro-based counterparts.

The novel biorenewable oligomers/polymers are effective toughening ingredients useful in thermoset materials including, but not limited to, coatings, adhesives, lubricants, inks, resins, and composites such as, for example, in UV curable coatings, and in thermal cure composites that require high biorenewable content and good performance. They are especially suitable for use as coatings on metal, wood, paper or plastic articles or surfaces.

It should be understood that the words oligomer and polymer are used interchangeably and are not intended to refer to any particular chain length.

Unless otherwise specified, "a," "an," "the," and "at least one" are used interchangeably and mean one or more than one.

Abbreviations used herein include:
BHBA, bio-based hyperbranched acrylate
CNSL, cashew nutshell liquid
ECNSL, epoxidized cashew nutshell liquid
CL, cardanol
ECL, epoxidized cardanol
TPP, triphenylphosphine
MHHPA, methyl hexahydrophthalic anhydride
MNA, methyl nadic anhydride
DMF, N,N-dimethylformamide
PMHE, H20-MHHPA-ECL
PMNE, H20-MNA-ECL
EPMHE, epoxidized PMHE
EPMNE, epoxidized PMNE
APMHE, acrylated PMHE
APMNE, acrylated PMNE
SBO, soybean oil
ESBO or ESO, epoxidized soybean oil
AESO or ASO, acrylated epoxidized soybean oil
CSO, SBO-g-CNSL branched polymer
ECSO, epoxidized SBO-g-CNSL
ACSO, acrylated SBO-g-CNSL

DETAILED DESCRIPTION OF ILLUSTRATIVE EMBODIMENTS

Figure 1:
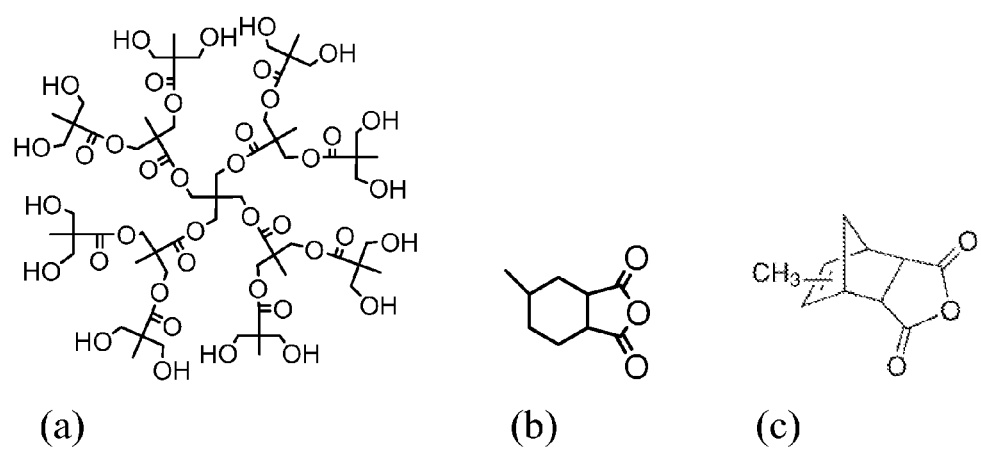
FIG. 1 shows a generic structure of (a) Boltorn H20, (b) MHHPA, and (c) MNA.

In one aspect, the invention provides a high biorenewable content hyperbranched oligomer/polymer formed from a cashew nutshell oil or liquid, or a component or derivative thereof, and a hyperbranched polyol. The hyperbranched polyol preferably has a dendritic structure. The hyperbranched polyol can be, for example, a polyester polyol, a polyether polyol, any other multi-hydroxy functionalized molecule. Examples of a hyperbranched polyester polyol include Boltorn™ H20 or Boltorn™ H30. The hyperbranched oligomer/polymer of the invention typically contains a hyperbranched polymer core having radial branches. A plurality of the radial branches, and in some embodiments all or substantially all of the radial branches, contain a diester linking segment (derived from an anhydride functionalizing reactant, described in more detail below) and, linked to the polymer core via the linking segment, a cashew nutshell oil or liquid component or derivative thereof, which CNSL component or derivative thereof is described in more detail below.

The invention further includes a modified, derivatized or functionalized hyperbranched oligomer/polymer, such as a functionalized oligomer/polymer that is epoxidized, acrylated, thiolated or functionalized with any other functional group, moiety or functionality, particularly one that contains carbon-carbon double bonds, such as allyl or vinyl ether.

Also provided is a method for synthesizing the hyperbranched oligomer/polymer of the invention. In one embodiment, a hyperbranched polyol, such as a dendritic polyol, is reacted with an anhydride, for example, to yield a polycarboxylic acid intermediate. The dendritic structure, when present, functions as the core of the product hyperbranched oligomer/polymer. The dendritic polyol is preferably a polyester polyol, more preferably a hyperbranched polyester polyol such as Boltorn™ H20 or Boltorn™ H30. Any anhydride can be used; for example, over 1300 anhydrides can be obtained from Sigma Aldrich. The anhydride can be cyclic or acyclic. A preferred anhydride is a cyclic anhydride that contains a ring structure. The ring structure can be aromatic, cycloaliphatic and/or can take the form of a fused ring structure. Examples of suitable anhydrides include methyl hexahydrophthalic anhydride (MHHPA) or methyl nadic anhydride (MNA). Ultimately, the anhydride reactant is incorporated into the oligomeric structure as a diester linking segment positioned between the hyperbranched polymer core and the cashew nutshell oil or liquid component or derivative thereof (see for example Scheme 1 of Example I). In another embodiment, a hyperbranched polyol is used in a ring opening reaction with epoxidized CNSL or component or derivative thereof, such as epoxidized cardanol. In another embodiment, hydroxy functional CNSL or a component or derivative thereof, which is commercially available from Cardolite Inc., can be reacted with a diisocyanate, then reacted with a hyperbranched polyol to yield the desired hyperbranched core molecule.

The polycarboxylic acid intermediate is reacted with a cashew nutshell oil or liquid, or a component or derivative thereof, preferably an activated or functionalized cashew nutshell oil or liquid component or derivative thereof (e.g., epoxidized cardanol, ECL), to yield a hyperbranched oligomer/polymer containing multiple cashew nutshell oil or liquid derived branches. The polycarboxylic acid and the epoxidized cashew nutshell oil or liquid component or derivative thereof (such as cardanol) are combined in a ratio that permits functionalization (derivatization) of at least four, preferably at least half, more preferably at least 75%, and even more preferably substantially all the end group sites on the molecular core with the cashew nutshell oil or liquid component or derivative thereof to yield a hyperbranched oligomer/polymer containing multiple CNSL branches. In the case of a dendritic molecular core, the CNSL branches on the resulting hyperbranched oligomer/polymer are radially positioned around the central core.

Cashew nutshell liquid (CNSL) is a renewable biomaterial extracted from the soft honeycomb structure inside the cashew nutshell. Naturally occurring components of CNSL include anacardic acid and cardol where R is a linear saturated, monounsaturated, or polyunsaturated aliphatic side chain, for example $R=C_{15}H_{31-n}$ where n=0, 2, 4, 6.

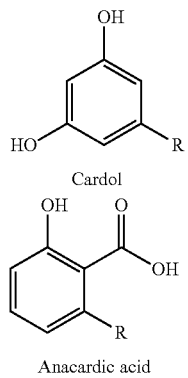

Cardol

Anacardic acid

Cardanol is another naturally occurring component of CNSL but is also produced commercially from the decarboxylation of anacardic acid where R is a linear saturated, monounsaturated, or polyunsaturated aliphatic side chain, for example $R=C_{15}H_{31-n}$ where n=0, 2, 4, 6.

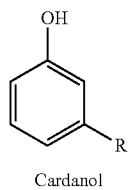

Cardanol

Cardanols include the various decarboxylated derivatives obtained by thermal decomposition of any of the naturally occurring anacardic acids. The term "cardanol" thus includes more than one compound because the composition of the side chain varies in its degree of unsaturation. Tri-unsaturated cardanol, the major component (41%) is shown below. The remaining cardanol is 34% mono-unsaturated, 22% bi-unsaturated, and 2% saturated. Cardanol is preferred as a CNSL component for use in preparing the branched and hyperbranched oligomer/polymer of the invention and is available in several forms from Cardolite, Inc. An exemplary cardanol is 3-n-pentadecadienyl phenol.

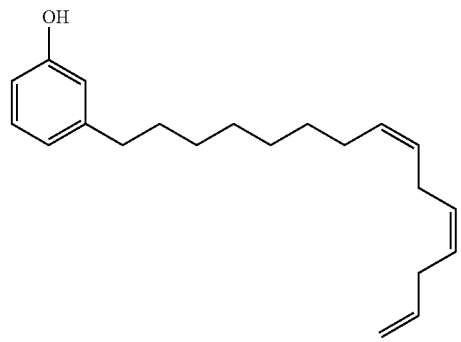 [SMILES: C=CC/C=C\C/C=C\CCCCCCCc1cccc(O)c1]

The aromatic ring in the CNSL component provides a strong chemically resistant backbone, while the hydroxyl group provides good adhesion and reactivity for fast and low temperature cure. A long aliphatic side chain provides excellent water resistance, good flexibility and low viscosity.

In the present invention, the CNSL component used to make the branched or hyperbranched oligomers/polymers is not limited to a cardol, a cardanol or an anacardic acid, but can be any fatty acid-containing component, constituent or derivative of CNSL including but not limited to an anacardic acid, a cardol, a cardanol, a 2-methyl cardol or cardanol, and chemical or enzymatic derivatives thereof. These substances may naturally vary in their fatty acid chain length and degree of unsaturation, or may be chemically altered to vary in their fatty acid chain length and degree of unsaturation; the invention is not limited to the use of any CNSL component with any particular fatty acid chain length or degree of unsaturation. More generally, the cashew nutshell liquid or oil component or derivative thereof that is useful in the invention includes an aromatic moiety and at least one unsaturated C=C bond. The unsaturated C=C bonds permit subsequent optional activation or functionalization (e.g., epoxidation and acrylation) so as to facilitate crosslinking later, during the curing process. Typically UV curing is utilized, but the material can also be thermally cured or cured via an auto-oxidation process or by reaction with multi-functional thiols under elevated temperatures.

Preferably, as part of the method of making the hyperbranched oligomer/polymer of the invention, the CNSL component is activated for reaction with a carboxylic acid on the polycarboxylic acid intermediate; more preferably, the CNSL component is epoxidized. A preferred site for incorporation of an epoxy group that permits reaction with the polycarboxylic acid is at a phenolic hydroxyl of the cashew nutshell oil or liquid component. The epoxy group of the activated cashew nutshell oil or liquid reactant can participate in a ring-opening reaction with the carboxylic acid on the polymer core to facilitate covalent linkage of the cashew nutshell oil or liquid component to the hyperbranched structure. Examples of an epoxidized cardanol (ECL) useful as a reactant in the method of the invention include Cardolite® NC 513 or NC 2513, available from Cardolite, Inc. The reactive epoxy group of the ECL allows for covalent attachment of the nutshell oil or liquid to the polycarboxylic acid core, as exemplified in Scheme 1 of Example I.

The invention includes the resulting hyperbranched oligomer or polymer, as both a product, and as a product by process, as well as derivatives, functionalized or activated forms thereof, such as an epoxidized hyperbranched oligomer or polymer, or an acrylated hyperbranched oligomer or polymer. A hyperbranched epoxidized oligomer/polymer can be made, for example, by treating the unsaturated hyperbranched oligomer/polymer with an oxidizing agent, such as any peracid including performic acid and peracetic acid, to yield the epoxidized form. The resulting epoxidized oligomer/polymer can optionally be treated with an acrylic acid to yield a hyperbranched acrylated oligomer/polymer.

An important feature of the bio-based hyperbranched oligomer/polymer of this aspect of the invention is its relatively "hard" core (imparted by the dendritic/hyperbranched core and the aromatic moiety or segment of the CNSL component or derivative) combined with a flexible shell (imparted by the fatty chains of the CNSL component or derivative thereof). The flexible shell of the structure can advantageously contain flexible fatty branches that can be functionalized as desired, as with epoxide or acrylate, as mentioned above, or with thiolate, or any other functional group, moiety or functionality, particularly one that contain carbon-carbon double bonds, such as allyl or vinyl ether, for use in many different industrial applications.

In another aspect, the invention provides a high biorenewable content branched oligomer/polymer based on a plant oil or liquid component, such as soybean oil (SBO), and a cashew nutshell oil or liquid (CNSL) component. The branched oligomer/polymer includes a plant oil backbone, and branch chains or "grafts" derived from cashew nutshell oil or liquid. To briefly reiterate and as described in more detail above, the cashew nutshell oil or liquid component that is used as a reactant to make the oligomers/polymers of the invention can include, without limitation, any CNSL component such as an anacardic acid, a cardol, a cardanol, a 2-methyl cardol or derivative thereof, and can vary in the length and degree of unsaturation of its fatty acid(s). The mixed aliphatic/aromatic structure of cardanol makes it particularly suitable for use in the present invention. More generally, the cashew nutshell liquid or oil reactant includes an aromatic moiety and at least one unsaturated C=C bond.

The number of CNSL-derived branch chains grafted onto each fatty acid chain of the plant oil backbone may be affected by the degree of unsaturation of the constituent plant oil. For example, if a plant fatty acid normally contains three C=C double bonds, up to three CNSL chains can be grafted onto the epoxidized form of that fatty acid chain. The CNSL chains themselves can contain one or more sites of unsaturation (C=C double bonds) or they can be functionalized, for example with one or more epoxide, acrylate or thiol groups.

The method of making the branched oligomer/polymer of this aspect of the invention typically begins with an epoxidized plant oil as the starting material. The method involves introducing cashew nutshell oil or liquid, or a component or derivative thereof as described herein, onto the epoxidized plant oil backbone at the sites of epoxidation to yield a plant oil-g-CNSL oligomer/polymer. Cardanol or a functionalized or derivatized form thereof is a preferred CNSL component, because the phenolic hydroxyl group of cardanol reacts with the epoxy group on the epoxidized plant oil.

The resulting plant oil-g-CNSL oligomer/polymer is optionally functionalized by epoxidation of the CNSL chains themselves, to yield an epoxidized plant oil-g-CNSL oligomer/polymer. An epoxidized plant oil-g-CNSL oligomer/polymer can be made, for example, by treating the unsaturated branched oligomer/polymer with an oxidizing agent, such as performic acid or peracetic acid, to yield the epoxidized form. The resulting epoxidized plant oil-g-CNSL oligomer/polymer can optionally be treated with an acrylic acid to yield an acrylated branched plant oil-g-CNSL oligomer/polymer. See for example Scheme 2 of Example II. The invention thus includes modified, derivatized or functionalized branched plant oil-g-CNSL oligomer/polymers, including but not limited to a functionalized oligomer/polymer that is epoxidized or acrylated on the CNSL chains as just described, as well as one that is thiolated or functionalized with any other functional group, moiety or functionality, particularly one that contains carbon-carbon double bonds, such as allyl or vinyl ether. More particularly, the invention includes the branched plant oil-g-CNSL oligomer/polymer, as both a product, and as a product by process, as well as derivatives, such as an epoxidized branched oligomer/polymer, or an acrylated branched oligomer/polymer.

The plant oil backbone in this aspect of the invention to which the CNSL components are grafted can be from any desired plant oil. Vegetable and nut oils can be used. Exemplary plant oils that can be used to form the branched oligomer/polymer include, without limitation, soybean oil, linseed oil, sunflower oil, safflower oil, canola oil, corn oil, rapeseed oil, coconut oil, olive oil and castor bean oil. Exemplary nut oils can include walnut oil, almond oil, hazelnut oil, macadamia nut oil, pistachio nut oil, and the like.

The methods of making a branched or hyperbranched oligomer/polymer are preferably performed in bulk. Reactions performed "in bulk" are reactions in which no solvent is added to the system and the oil itself serves as the diluent. Alternatively, a solvent such as toluene or xylene can be used to decrease viscosity and potentially increase yield.

In yet another aspect, the invention provides compositions and formulations containing the branched or hyperbranched CNSL-containing oligomer/polymer of the invention. In addition to the novel CNSL-containing oligomer/polymer, a composition or formulation optionally contains any one or more of the following constituents, in any combination: a photoinitiator; an adhesion promoter; a reactive diluent; an additional oligomer/polymer, preferably a bio-based polymer such as acrylated soybean oil (ASBO); and/or a synthetic hyperbranched oligomer such as a hyperbranched polyester acrylate (e.g., CN2300 (A8 acrylate functionality); CN2301 (A9 acrylate functionality); CN2302 (A16 acrylate functionality); CN 2303 (A6 acrylate functionality) or CN2304 (A16 acrylate functionality) available from Sartomer Company, Inc). Photoinitiators are well known to the art and include, without limitation, α-hydroxyketones, phenylglyoxylates, benzyldimethyl-ketals, α-aminoketones, mono acyl phosphines (MAPO), bis acyl phosphines (BAPO), metallocenes, and iodonium salts. Any photoinitiator or combination of photoinitiators can be used for UV curing. Examples include the IRGACURE™ and DAROCUR™ photoinitiators available from Ciba Specialty Chemicals (available on the World Wide Web at basf.com). Likewise, the optional adhesion promoter can be any convenient adhesion promoter such as an Ebecryl™ compound from Cytec Industries, Inc., e.g., as Ebecryl 168™ or Ebecryl 170™. Optional adhesion promoters include, without limitation, acrylated/methacrylated methoxy/ethoxy silanes. The optional reactive diluent can include, for example, tetrahydrofurfuryl acrylate (THFA) or any monomers available from many commercial sources such as Sartomer, Inc. (available on the World Wide Web at sartomer.com/monomer.asp), and can be used in combination with monomers/oligomers/polymers made or used in this invention. The optional additional UV-curable oligomer/polymer(s) are not limited to any particular curable oligomer/ polymer and include, for example, oligomers and polymers available from Sartomer, Inc. (available on the World Wide Web at sartomer.com/prodline.asp?plid=2) and many other commercial sources.

Also included in the invention is a cured coating, film, adhesive, composite material and the like, made by curing the formulation of the invention. The formulation can be cured in any suitable manner such as by UV-curing, thermal curing, thiol-mediated curing, or air curing/autooxidation. Articles and surfaces coated with the cured coating, film, adhesive, or made from or coated with the composite material, are also included in the invention. The oligomers/polymers of the invention can be used in paints and enamels, varnishes, laminates, rubber products (e.g., in a vulcanization process), liquid crystalline compounds, and in binders and adhesives.

EXAMPLES

The present invention is illustrated by the following examples. It is to be understood that the particular examples, materials, amounts, and procedures are to be interpreted broadly in accordance with the scope and spirit of the invention as set forth herein.

Example I

Plant Oil Based, UV Curable Hyperbranched Polymer with "Hard Core, Flexible Shell" Structure It is well known that the macroscopic characteristic of a material is determined to a large extent by its molecular structures. Hyperbranched polymers have attracted considerable attention due to their remarkable properties. In our previous work (Chen et al., 2010, J. Coat. Technol. Res., 7: 603-613; Chen et al., 2011 Prog. Organic Coatings, 71(1):98-109; Wu et al., 2011, Polymer International, 60(4):571-577) we showed that the introduction of petrochemical-based hyperbranched acrylates (HBA) into polymers derived from biorenewable materials generated UV-curable coatings that exhibited enhanced performance. In order to further increase the biorenewable content of these coating materials, we have developed biorenewable hyperbranched acrylates (BHBAs) with performance that is comparable to or even better that that of petrochemical based hyperbranched acrylates.

Accordingly, a new, green approach to prepare bio-based hyperbranched acrylates (BHBAs) is presented. Plant oil based hyperbranched acrylates were synthesized by chemically attaching epoxidized cashew nutshell liquid component, epoxidized cardanol (ECL) onto an anhydride modified hyperbranched polyester polyol. The novel BHBAs had molecular structure composed of a hard, high $T_g$ core, and a flexible shell comprised of reactive fatty chains. The mechanical properties, thermal stability and glass transition temperatures ($T_g$) of their UV cured films were studied and compared to a petrochemical based hyperbranched acrylate. Though showing lower thermal stability, the novel BHBAs had higher photopolymerization conversion, higher $T_g$ and better mechanical properties such as nanoindentation hardness, reduced modulus, surface storage modulus and storage stiffness. The reported approach will further increase the biorenewable content of current bio-based UV-curable coatings, and promote the utilization of chemicals derived from renewable materials in the fast growing UV curable coating industry.

The synthesis and properties of novel bio-based hyperbranched acrylates (BHBAs) are presented below. Industrially viable and cost effective synthesis chemistry was utilized to obtain the BHBAs, which will facilitate future technology transfer and commercialization. The designed "hard core, flexible and reactive shell" structure of the novel BHBAs resulted in better material properties than the benchmark petrochemical based HBA.

Experimental

Materials

Boltorn™ H20 was supplied by Perstorp Polyols Inc. Epoxidized cardanol (ECL) was kindly provided by Cardolite Co. Ltd. Methyl hexahydrophthalic anhydride (MHHPA), methyl nadic anhydride (MNA), triphenylphosphine (TPP), N,N-Dimethylformamide (DMF), acetic acid, hydrogen peroxide, hydroquinone, acrylic acid, AMBERLYST® 120H ion-exchange resin (A120), were purchased from Aldrich. Petrochemical based hyperbranched acrylate CN2302 was supplied by Sartomer Company Inc.; it has 16 acrylate functionalities per molecule with acrylate equivalent weight of 122 g/mol. Free radical photoinitiator Irgacure 2022 (PI) was supplied by Ciba Specialty Chemicals. All materials were used as received.

Synthesis

The synthesis routes for the designed BHBAs are illustrated in Scheme 1.

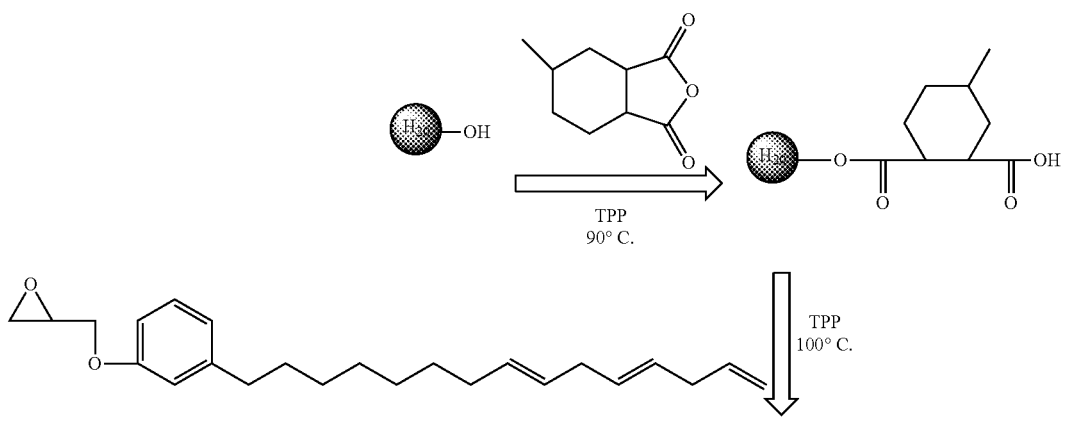

Scheme 1. The synthesis of APMHE.

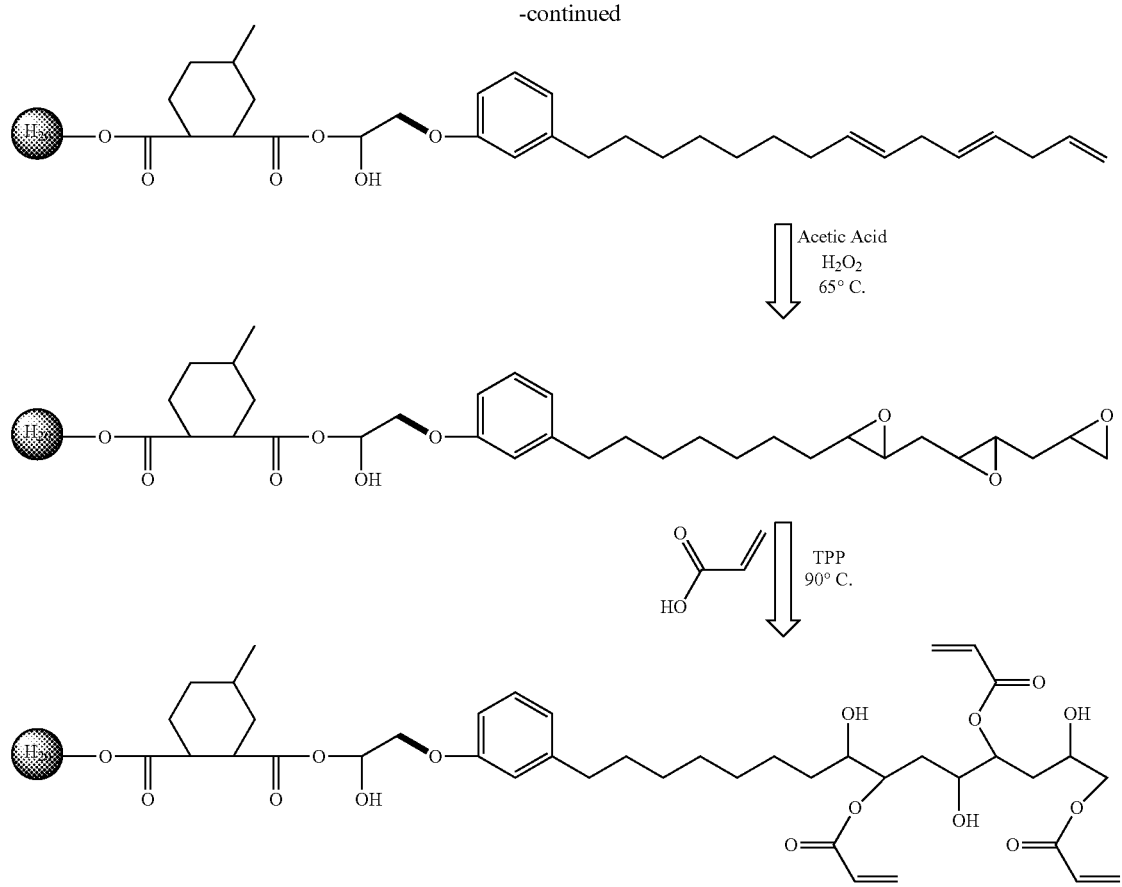

Synthesis of H20-MHHPA

In first step the hydroxyl groups on H20 were transformed to carboxylic acid groups by reacting with an anhydride MHHPA. The reaction was conducted by adding 8.6 g (4.9 mmol) of H20, 11.6 g (69 mmol) of MHHPA, 17.2 g of DMF and 0.2 g of TPP into a one-necked 150 mL round bottom flask fitted with a magnetic stirrer. The reaction mixture was stirred and maintained at heated 90° C. for 24 hours.

Synthesis of PMHE

In the second step, hyperbranched polymer H20-MHHPA-ECL (PMHE) was synthesized by reacting the epoxy groups on ECL with carboxylic acid groups of H20-MHHPA. 27.6 g (69 mmol) of ECL and 0.28 g of TPP were directly added into the above reaction vessel and stirred at 90° C. for 24 h to obtain the PMHE.

Synthesis of Epoxidized PMHE-EPMHE

The synthesized PMHE were cooled to 65° C. followed by the addition of 4 g (66.7 mmol) of acetic acid, 20 g of toluene and 9.6 g of A120 catalyst. 18.5 g of 50% hydrogen peroxide (272.1 mmol) was slowly added to the mixture maintained at 65° C. in a water bath. After stirring for 5 h, the A120 was filtered off, the reactants was washed two times with saturated sodium carbonate solution at 50° C. and three times washed with water at 50° C. Finally, water and toluene were removed using a rotary evaporator to obtain EPMHE.

Synthesis of APMHE by Acrylation of EPMHE with Acrylic Acid 0.03 g of hydroquinone and 0.27 g of TPP was added into the 15 g EPMHE. The mixture was heated to 100° C.; 2.84 g (39.4 mmol) of acrylic acid were slowly added. After 12 hours reaction, the APMHE was obtained. APMHE is a viscous, dark brownish resin with about 39.1 wt. % biorenewable content. It has twenty six theoretical acrylate functionalities per molecule.

The other plant oil based UV curable hyper-branched polymer APMNE was synthesized according to the same route as APMHE by replacing MHHPA with MNA. APMNE is a viscous dark brownish resin with about 38.9 wt. % biorenewable content. It has twenty six theoretical acrylate functionalities per molecule.

UV Curing of BHBAs 3 wt. % photoinitiator Irgacure 2022 (PI) was mixed with the BHBAs, the UV cured films were obtained by UV curing using a Fusion LC6B Benchtop Conveyor with an F300 UVA lamp in air, the total UV irradiation energy was ~3600 mJ/cm$^2$ as measured by UV Power Puck® II from EIT Inc.

Characterizations

NMR spectra were obtained in deuterated chloroform using a JEOL 400 MHz ECA400 spectrometer, equipped with a 24 position autosampler. The FTIR and real time FTIR (RTIR) experiments were performed using a Thermo Scientific Nicolet 8700 with detector type DTGS KBr. For the RTIR experiments, the light source was a LESCO Super Spot MK II 100 W DC mercury vapor short-arc lamp, scans were taken over a 120 s period at 2 scans per second. The UV source was adjusted to 36 mWcm$^{-2}$ and the experiments were performed in air, the C=C conversion was monitored at 810 cm$^{-1}$. Three measurements were conducted for each sample and the average conversion was calculated and presented. DSC experiments were performed using a TA Instruments Q2000 DSC with heat-cool-heat cycle. The ramping rate is 10° C./min Thermogravimetric analysis (TGA) was performed using a TA Instruments TGA Q500 under nitrogen purging, the temperature was ramped from 25 to 650° C. at a ramping rate of 10° C./min. Nanoindentation testing and nanoDMA testing were created in a Hysitron TriboIndentor® with a Berkovich® diamond indenter of tip radius ~114 nm. The nanoindentation test used conduced with load controlled mode. 500 μN load was used, with 5 seconds loading time, 5 seconds hold time, and 5 seconds unloading time to complete the test cycle. Three indentations that were 25 μm apart were conduced for each sample (standard deviations of reduced modulus and nanoindentation hardness are 4.7% and 0.4%, respectively). The nanoDMA test was conducted using variable dynamic loading mode, the beginning quasi static load was 5 μN and the end quasi static load was 100 μN. The frequency was 50 Hz with dynamic load of 1 μN. There were 15 segment steps and the loading rate was 10 μN/s.

Results and Discussion

FTIR Analysis

Figure 2:
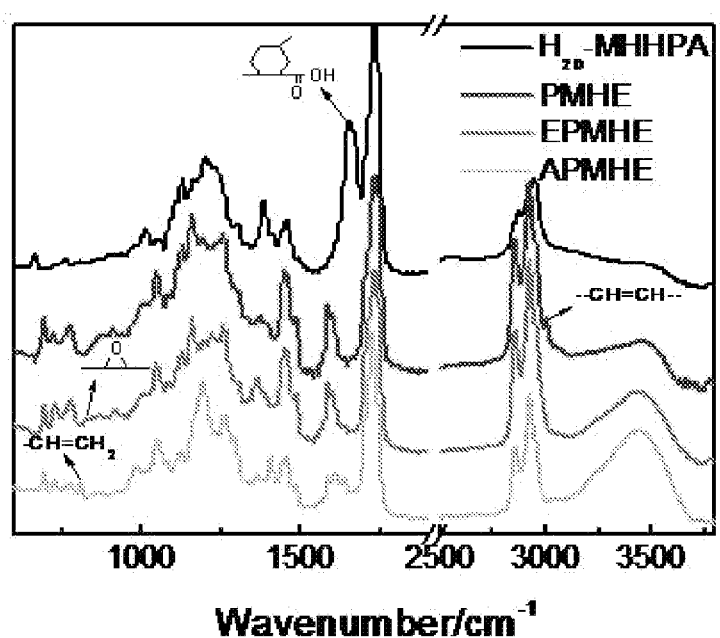
FIG. 2 shows the FTIR spectrum of APMHE and the intermediates.

The FTIR spectrum of APMHE and its intermediates were showed in FIG. 2. Comparing the IR spectra of H20-MHHPA and PMHE, the presence of fatty unsaturation signal at 3010 $cm^{-1}$ and the disappearance of carboxylic carbonyl at 1660 $cm^{-1}$ indicated the ring open reaction of H20-MHHPA and ECL.

In the FTIR spectrum of EPMHE, the characteristic epoxide bands at 824 $cm^{-1}$ appeared and the double bonds disappeared compared to that of PMHE, showing that the C=C double bonds were epoxidized to epoxy group completely.

For the FTIR spectrum of the synthesized APMHE, epoxy peaks appeared at 824 cm for EPMHE but disappeared for APMHE, the absorption peaks at 810 $cm^{-1}$ (=CH) confirmed the acrylate double bond had been incorporated into the APMHE.

$^1$H NMR Analysis

Figure 3:
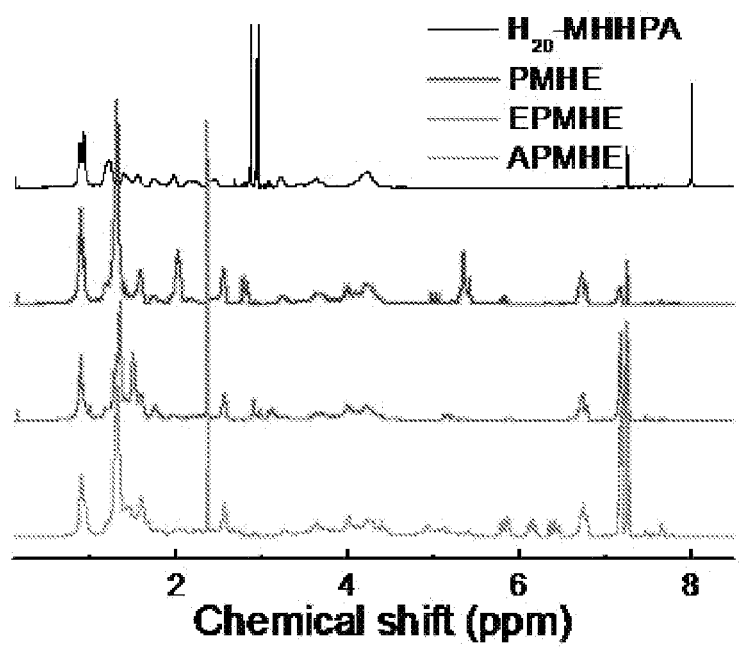
FIG. 3 shows the $^1$H NMR of APMHE and its intermediates.

The $^1$H NMR spectrum of APMHE and its intermediates are shown in FIG. 3. The $^1$H-NMR spectrum of PMHE was assigned as following in ppm (CDCl$_3$): —CH$_3$, 0.810-0.878; —C=C—CH$_2$—, 1.89-2.08; —CH=HC—, 5.24-5.45; aromatic protons, 6.58-6.81. Compared to that of H20-MHHPA, the carboxylic acid protons of 8.01 disappeared, indicating the reaction of H20-MHHPA and ECL.

The $^1$H NMR spectrum of EPMHE was assigned as following in ppm (CDCl$_3$): —CH$_3$, 0.79-0.88; aromatic protons, 6.59-6.80, epoxide ring —CH—CH—, 2.87-3.16. Compared to that of PMHE, the epoxy signal appeared, and the olefinic protons at 5.24-5.45 and 1.89-2.08 disappeared. The data confirmed that the C=C double bonds were epoxidized to epoxy groups completely.

The $^1$H NMR spectrum of APMHE was assigned as following in ppm (CDCl$_3$): CH$_2$=, 5.83 and 6.38; =CH—C—, 6.12; —C—CH$_2$—C—, 1.27; —CH$_3$ 0.89 ppm. Compared to that of EPMHE, the epoxide ring protons disappeared and C=C appeared, showing that the acrylate double bond had been incorporated into the APMHE.

$^{13}$C NMR Analysis

Figure 4:
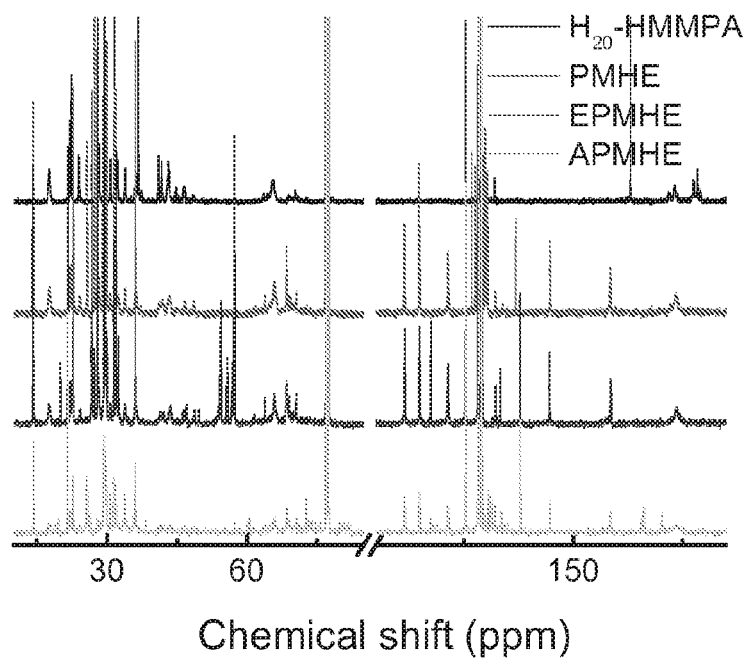
FIG. 4 shows the $^{13}$C NMR of APMHE and its intermediates.

The $^{13}$C NMR spectrum of APMHE and its intermediates are shown in FIG. 4. Compared to the $^{13}$C NMR spectrum of H20-MHHPA, the peak around 178.48 for the carboxylic carbon disappeared, which indicates the successful reaction of H20-MHHPA and ECL.

Compared to the $^{13}$C NMR spectrum of PMHE, the —CH=HC— disappeared and the epoxy carbon appeared at 54.02, 55.87 and 57.41 for the $^{13}$C NMR spectrum in EPMHE. The results confirmed that the carbon double bonds were epoxidized to epoxy group completely.

Compared to the $^{13}$C NMR of EPMHE, the epoxy carbon disappeared and C=C appeared at 130.43 and 131.09 in the $^{13}$C-NMR spectrum of APMHE, which illustrated that the acrylate C=C bond had been incorporated in the APMHE.

The Photopolymerization Kinetics of CN2302, APMHE and APMNE

Figure 5:
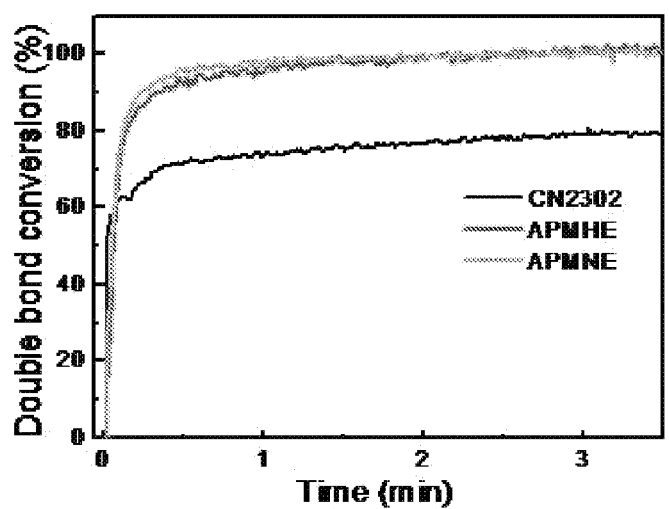
FIG. 5 shows photopolymerization double bond conversion versus irradiation time for CN2302, APMHE and APMNE.
Figure 6:
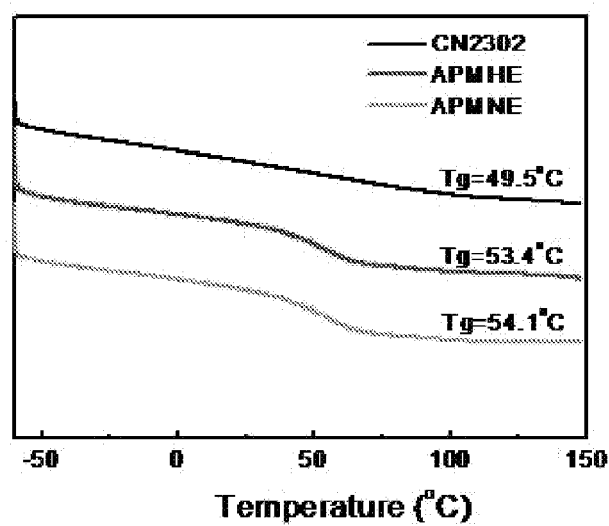
FIG. 6 shows DSC plots of UV cured films of CN2302, APMHE and APMNE.

The photopolymerization double bond conversion versus time curves for CN2302, APMHE and APMNE are shown in FIG. 5. It can be seen that plant oil based UV curable hyper-branched polymer APMHE and APMNE had similar polymerization rate as compared to CN2302, as determined by the initial slope of the conversion-time curves. It was also noticed that the APMHE and APMNE all had much higher final double bond conversion (~100%) than CN2302. The higher acrylate conversion was attributed to the higher acrylate mobility during photopolymerization as they are on the more flexible fatty chains of ECU DSC $T_g$ of CN2302, APMHE and APMNE DSC analysis for UV cured CN2302, APMHE and APMNE films were shown in FIG. 6. Despite the fact that the plant oil based UV curable hyper-branched polymer A PMHE and AMINE had soft fatty chains, they all showed higher $T_g$ than CN2302. This was attributed to the higher $T_g$ core in the molecule that is composed of the high Tg polyester structure from H20 and the aromatic ring from the natural CNSL structure, and higher final double bond conversion for APMHE and APMNE as compared to CN2302.

The Thermal Stability of CN2302, APMHE and APMNE

Figure 7:
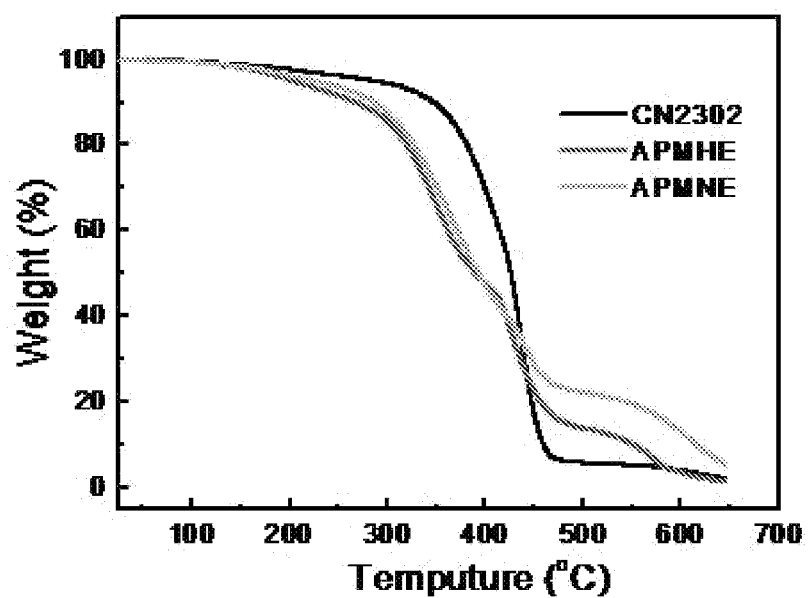
FIG. 7 shows TGA plots of UV cured films of CN2302, APMHE and APMNE.

Comparative studies on the thermal stability of CN2302, APMHE and APMNE are shown in FIG. 7. It can be seen that the plant oil based UV curable hyper-branched polymer APMHE and APMNE had poor thermal stability compared to CN2302. It may be due to the poorer thermally stability of fatty chain than petroleum based structures.

Nanoindentation Hardness and Reduced Modulus of CN2302, APMHE and APMNE

Figure 8:
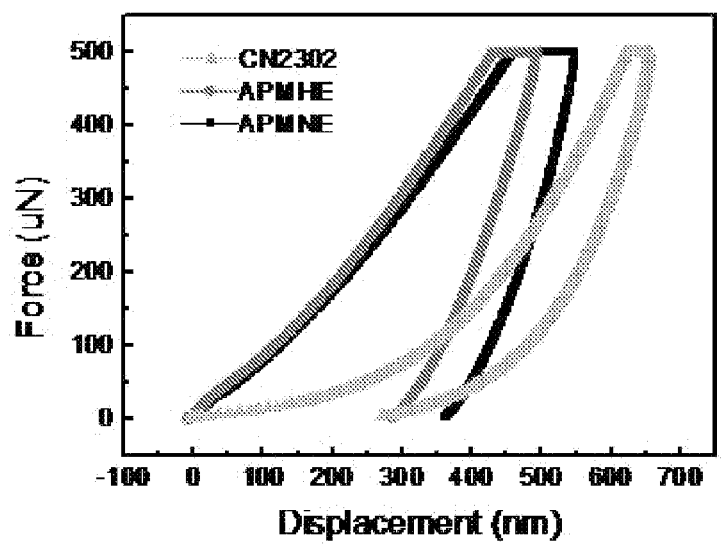
FIG. 8 shows the (a) load-displacement curves, (b) reduced modulus, and (c) nanohardness for CN2302, APMHE and APMNE.
Figure 8:
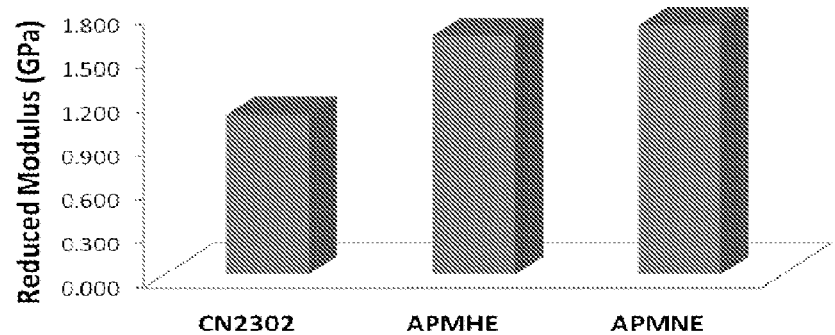
Figure 8:
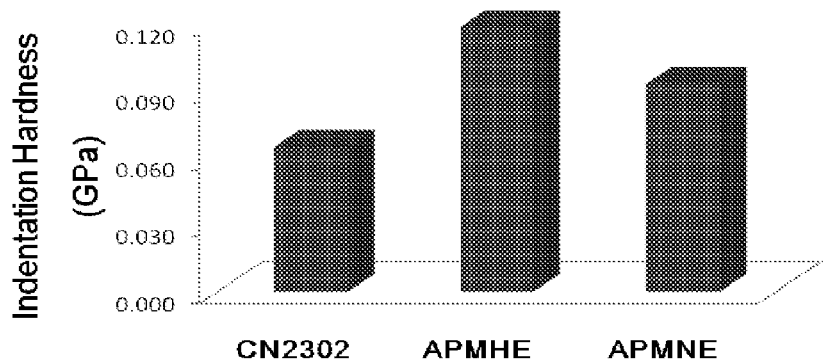

Nanoindentation technique was used to evaluate the mechanical properties of UV cured films of CN2302, APMHE and APMNE. The load-displacement curves for CN2302, APMHE and APMNE are shown in FIG. 8(a). First it is noticed that there was no discontinuities or steps in the curves, indicating that no cracks formed during nanoindentation test. The maximum displacement (penetration depth) of the plant oil based HBAs are much smaller than the commercial petroleum HBA CN2302. This implied that hardness and reduced modulus of the APMHE and APMNE were higher than those of CN2302.

Nanoindentation hardness (H) and reduced modulus ($E_r$) were determined from indentation curves and are shown in FIG. 8(b) and FIG. 8(c), respectively. Nanoindentation hardness indicates the resistance of a material to surface penetration by an indenter with a force applied to it, which is defined as the indentation load divided by the projected contact area of the indentation:

$$H = P_{max}/A_c.$$

Where $P_{max}$ is the peak load from the load-displacement curve, $A_c$ is the projected contact area and a function of contact depth, which can be measured and calculated directly from the indentation displacement.

The reduced modulus $E_r$ is related to Young's modulus $E_s$ of the test specimen through the following relationship from contact mechanics:

$$1/E_r = (1-v_i^2)/E_i + (1-v_s^2)/E_s.$$

Here, the subscript i indicates a property of the indenter material and v is Poisson's ratio. For a diamond indenter tip, $E_i$ is 1140 GPa and $v_i$ is 0.07. Poisson's ratio of the specimen, $v_s$, generally varies between 0 and 0.5 for most materials (though it can be negative) and is typically around 0.3.

The reduced modulus is given by:

$$E_r = \frac{\sqrt{\pi}}{2} \frac{S}{\sqrt{A_c}}$$

which can be calculated, having derived S and $A_C$ from the indentation curve using the area function. The reduced modulus and hardness of the plant oil based HBAs were found to be higher than petroleum HBAs CN2302. The "hard core, flexible reactive shell" structure of the synthesized BHBAs, and the higher acrylate photopolymerization conversion of the cured films account for this observation.

Surface Storage Modulus and Storage Stiffness of CN2302, APMHE and APMNE

Figure 9:
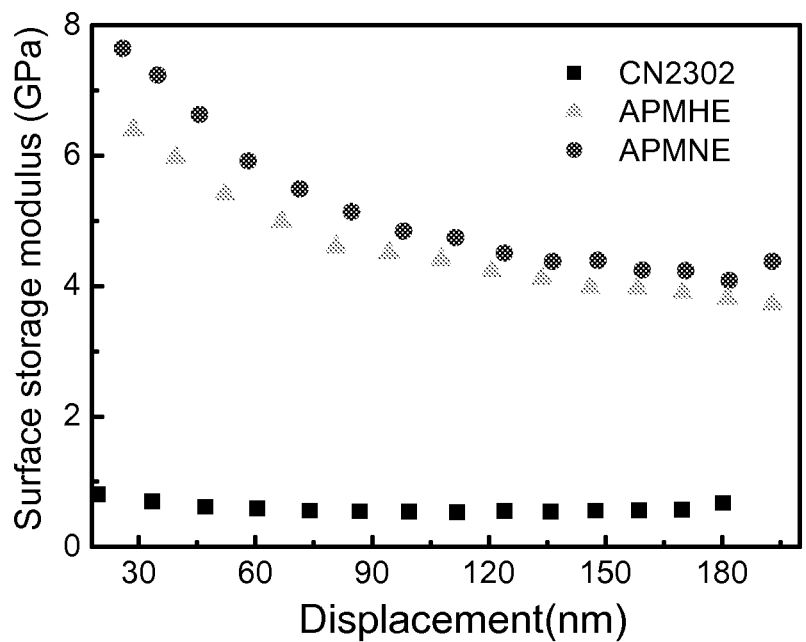
FIG. 9 shows NanoDMA (a) surface storage modulus, and (b) storage stiffness for CN2302, APMHE and APMNE.
Figure 9:
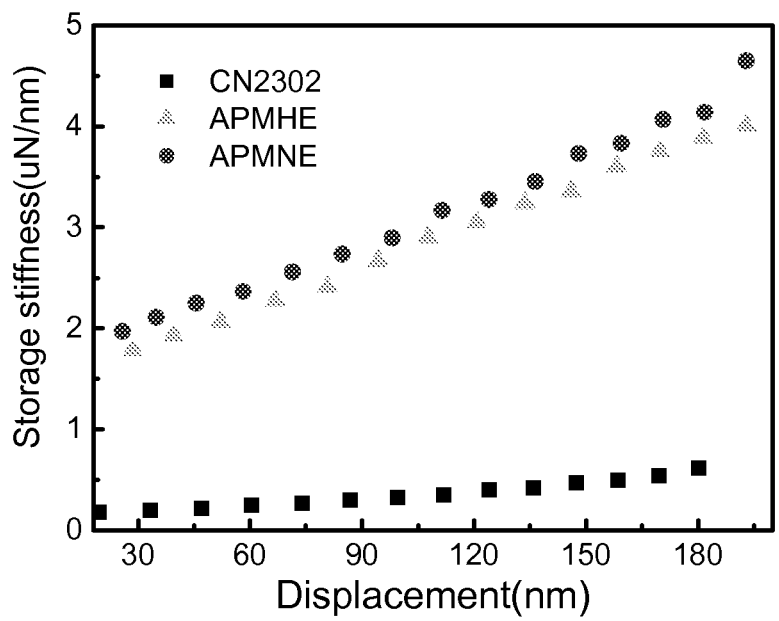

Nanoscale viscoelastic properties were measured using nanoindentation dynamic mechanical analysis (nano-DMA) tests. The NanoDMA surface storage modulus and stiffness as a function of displacement at a constant loading frequency of 50 Hz for the CN2302, APMHE and APMNE are shown in FIGS. 9(a) and 9(b), respectively.

The storage modulus relates to the in phase response of the material to the applied force and the elastic recovery of the sample, which is the amount of energy recovered from the sample subsequent to a loading cycle, and stiffness is the resistance of an elastic material to deformation by an applied force.

For each sample, with increasing displacement, the storage modulus slightly decreased while the storage stiffness increased rapidly. It is noted that the BHBAs exhibited higher storage modulus and storage stiffness than the petroleum HBA CN2302. As discussed earlier, the "hard core, flexible reactive shell" structure, and the high acrylate conversion of the cured films are considered the reasons for this observation.

Example II

High Biocontent Natural Plant Oil Based Branched Oligomers for Thermoset Materials Summary A new, green approach to improve the performance and biorenewable content of natural plant oil based UV-curable materials is presented. Novel soybean oil (SBO) based UV-curable branched oligomer SBO-g-CNSL (CSO) was synthesized by chemically introducing the cashew nutshell liquid (CNSL) onto the epoxidized soybean oil (ESBO) backbone, followed by epoxidization and acrylation to obtained UV or thermally curable oligomers. The epoxidized SBO-g-CNSL (ECSO) was used to produce cationic UV-curable coatings with a cycloaliphatic epoxy. Dramatic improvement in compatibility with the cationic photoinitiator and the cycloaliphatic epoxy were found for ECSO as compared to ESBO. The coatings based on ECSO exhibited much enhanced properties. Acrylated epoxidized SBO-g-CNSL (ACSO) with high biorenewable content was also prepared. The properties of UV cured films were studied by evaluating their mechanical properties, thermal stability and glass transition temperatures ($T_g$). The CNSL segment was found to play an important role in the much improved thermal and mechanical performance of the ACSO based coating films. This reported approach provided a new direction to the future development of advanced bio-based UV-curable oligomers from a variety of plant oils.

Introduction

We believe the best approach to advanced bio-based UV curable materials is to focus on careful molecular design and synthesis to incorporate biorenewable building blocks to overcome the inherent "softness" of natural plant oil-based materials. The "softness" is attributed to the presence of the long fatty chain, which results in lower $T_g$ that subsequently limits the plant oil-based materials' applications as robust surface coatings.

Here we report a novel green approach to improve the performance and renewable content of natural plant oil based UV-curable materials by introducing a component of cashew nutshell liquid (CNSL) such as cardanol (CL) onto the epoxidized natural plant oil based materials. Commercial epoxidized soybean oil (ESBO) was used to illustrate this approach, but almost any type of vegetable oil can be modified using this method.

Figure 10:
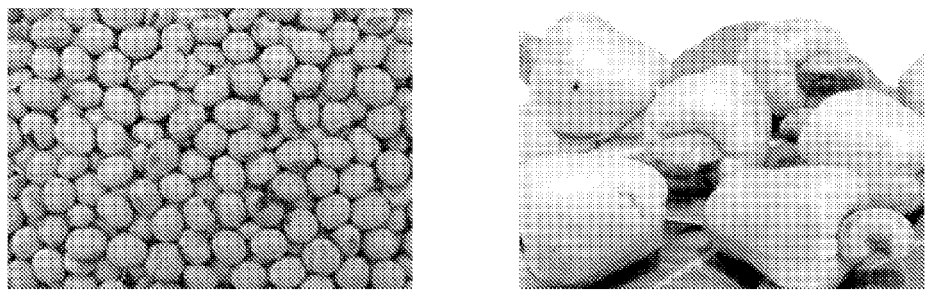
FIG. 10 shows the structure of soybean oil (SBO, left) and a component of CNSL, cardanol (CL, right).
Figure 10:
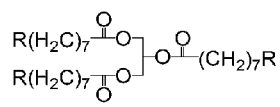
Figure 10:
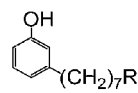

CNSL is contained in the soft honeycomb structure of the cashew nut. It is a non-edible by-product of the cashew industry. The generic structure of soybean oil and a component of CNSL, cardanol, are shown in FIG. 10. CNSL components such as cardol, cardanol and anacardic acid have a rigid benzene ring, higher fatty unsaturation content and shorter fatty chain as compared to soybean oil.

Novel soy-based branched CNSL-containing epoxy oligomer (ECSO) and acrylated CNSL-containing oligomer (ACSO) were chemically synthesized using epoxidized soybean oil (ESBO) as a starting material.

Experimental

Materials

Epoxidized soybean oil (ESBO) was obtained from Cargill Industrial Oil & Lubricants Company. A cashew nutshell liquid (CNSL) component (i.e., cardanol, CL) was provided by Cardolite Co. Ltd. Triphenylphosphine (TPP), acetic acid, hydrogen peroxide, hydroquinone, acrylic acid, AMBERLYST® 120H ion-exchange resin (A120), were purchased from Aldrich. Irgacure 2022 (PI) was kindly supplied by Ciba Specialty Chemicals. Cyracure™ UVR 6110 difunctional cycloaliphatic epoxide and UVI 6974 photoinitiator (PI) were obtained from Dow Chemical Company. All materials were used as received. Acrylated epoxidized soybean oil (AESO) was synthesized in our lab using the same acrylation process to produce ACSO.

Synthesis of CSO

Into a one-necked 250 mL round bottom flask fitted with a magnetic stirrer, 60 g (0.06 mol) of ESBO, 79.2 g (0.264 mol) of CNSL and 2.78 g of TPP were added. The reaction mixture was stirred in nitrogen atmosphere at 120° C. for 72 hours to obtain the soy-based UV-curable multi-branched oligomer SBO-g-CNSL (CSO). In this compound, the CNSL component is cardanol (CL).

Epoxidation of CSO

CSO was heated at 65° C., then 15 g (0.25 mol) of acetic acid, 20 g of toluene and 28 g of A120 catalyst were added. 68 g of 50% hydrogen peroxide (1.0 mol) was slowly added to the mixture maintained at 65° C. in a water bath. After stirring for 5 hours, the A120 was filtered out, the reactants was washed twice with saturated sodium carbonate solution at 50° C. and washed three times with water at 50° C. Finally, water and toluene were removed using a rotary vacuum evaporator to obtain the epoxidized CSO (ECSO).

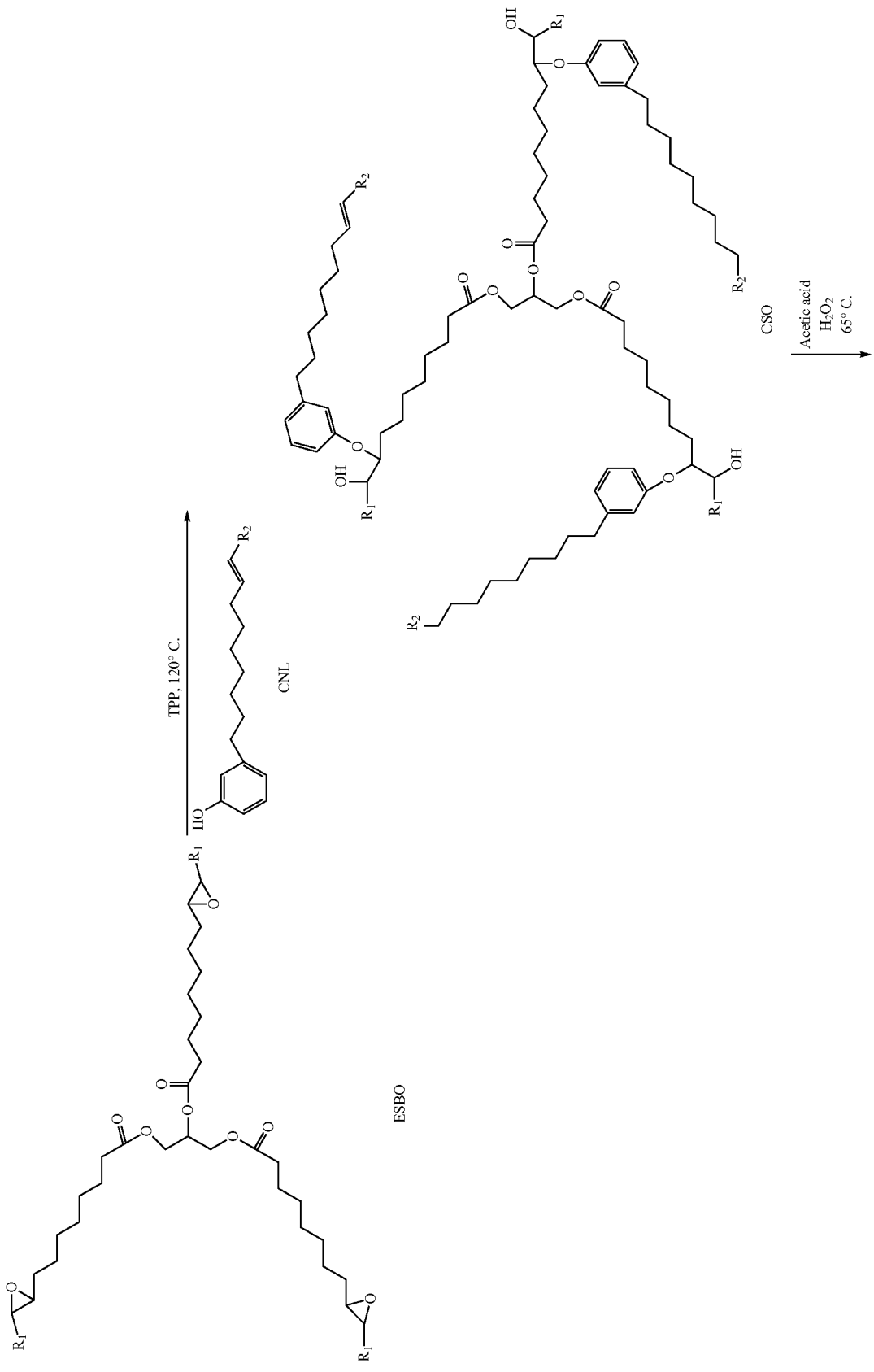
Scheme 2. Synthesis of soy-based UV-curable multi-branches polymer (ACSO)

-continued
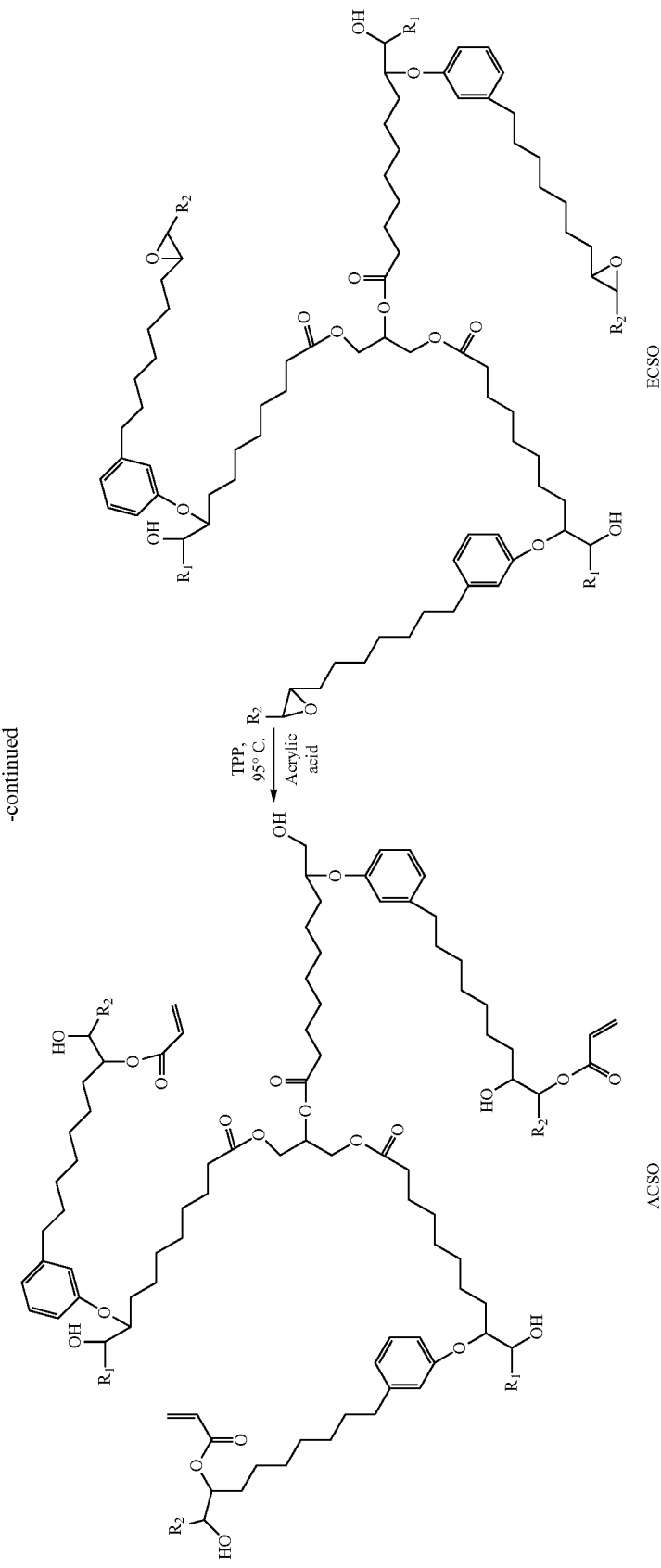

Acrylation of ECSO with Acrylic Acid 0.05 g of hydroquinone and 0.58 g of TPP were added into 32 g ECSO. The mixture was heated to 95° C. Then, 6.58 g (0.09 mol) of acrylic acid was slowly added. After 10 hours reaction, the ACSO was obtained. The synthesis of ECSO and ACSO is illustrated in Scheme 2.

UV Curing

After adding corresponding cationic or free radical photoinitiator (PI) into the synthesized oligomers, the liquid materials were drawdown on aluminum substrates and the corresponding cured films were obtained by UV curing with a Fusion LC6B Benchtop Conveyor with an F300 UVA lamp in air, the total UV irradiation energy was 7257 mJ/cm$^2$ as measured by UV Power Puck® II from EIT Inc.

Characterization

NMR spectra were obtained in deuterated chloroform with a JEOL 400 MHz ECA400 spectrometer equipped with a 24 position autosampler. Viscosity measurements were conducted with a Brookfield DV-II-Pro viscometer at 25° C. The Surface morphology of coating films was obtained with optical microscopy of JOBIN Yvon Horiba Raman Spectrometer model HR800.

Hardness testing was performed with a BYK Gardner pendulum hardness tester in Konig mode. Cross-hatch adhesion test was performed on aluminum Q-panels using a Gardco cross-hatch cutter which creates a 5×5 pattern of squares, adhesive tape was then applied onto the pattern and was pulled off, followed by a visual examination of coating loss. The FTIR and real time FTIR (RTIR) experiments were performed using a Thermo Scientific Nicolet 8700 with detector type DTGS KBr under nitrogen purge. For the RTIR experiments, the light source was a LESCO Super Spot MK II 100W DC mercury vapor short-arc lamp, scans were taken over a 120 s period at 2 scans per second. The UV source was adjusted to 36 mW/cm$^2$ and the experiments were performed in air, the C=C conversion was monitored at 810 cm$^{-1}$. DSC experiments were performed utilizing a TA Instruments Q2000 DSC with a heat-cool-heat cycle.

Thermogravimetric analysis (TGA) was performed using a TA Instruments TGA Q500 under nitrogen purging, the temperature was ramped from 25 to 650° C. at a ramping rate of 10° C./min. Tensile tests were performed using an Instron 5542 testing system (Instron Corp., Norwood, Mass.). ASTM D412-D dumbbell specimens were used, the strain rate was 0.2% s$^{-1}$.

Results and Discussion

Synthesis

The synthesis of CSO, ECSO and ACSO were conducted according to the routes shown in Scheme 2. The obtained CSO is a light brown resin with low viscosity, ECSO is a readily flowing brownish resin, and ACSO is a dark, brownish resin with high viscosity. The characterization of the products is described as below:

IR Analysis

Figure 11:
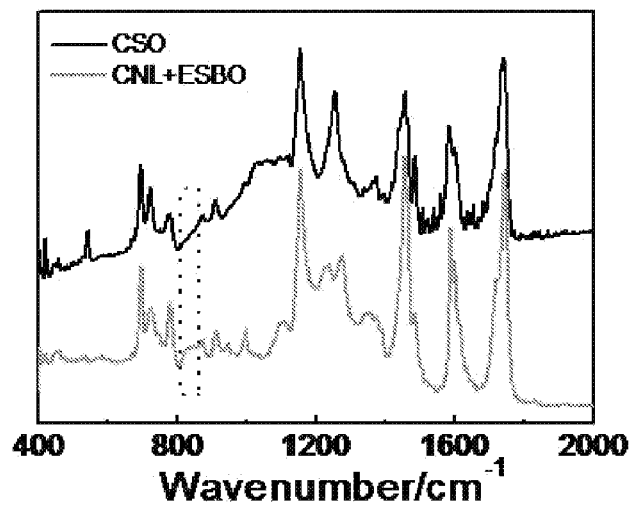
FIG. 11 shows the IR spectrum of CSO and the mixture of ESO and CNSL.

In the IR spectrum of CSO as shown in FIG. 11, the characteristic epoxide bands $\delta_{as}$ 843 cm$^{-1}$, $\delta_{sym}$ 824 cm$^{-1}$ clearly disappeared compared to that of the mixture of CNSL and ESBO. Instrumental analysis data suggested that the graft reaction of ESBO and CNSL was performed.

Figure 12:
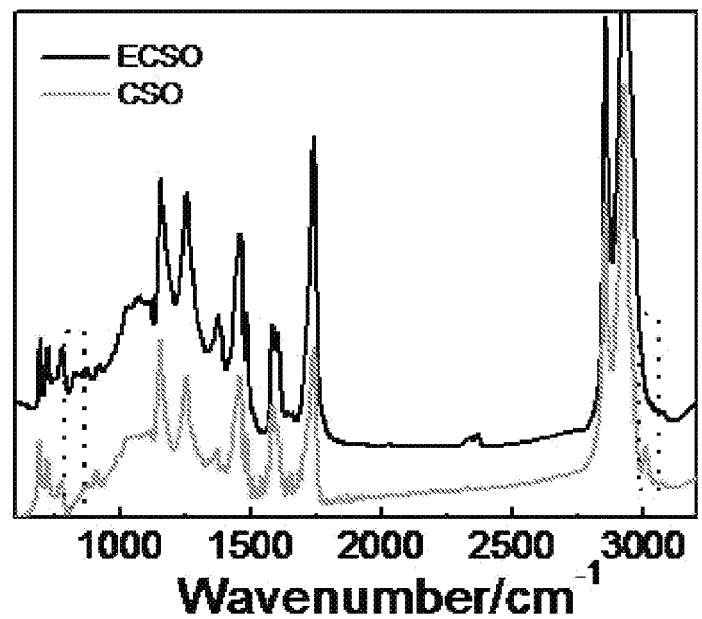
FIG. 12 shows the IR spectrum of CSBO and ECSBO.

In the IR spectrum of ECSO as shown in FIG. 12, the characteristic epoxide bands $\delta_{as}$ 843 cm$^{-1}$, and $\delta_{sym}$ 824 cm$^{-1}$ clearly appeared compared to that of CSO, at the same time, the presence of fatty unsaturations in the IR spectrum of CSO at 3007 cm$^{-1}$ disappeared compared to that of CSO. The FTIR spectra confirmed the results that the C=C double bonds were epoxidized to epoxy group completely.

Figure 13:
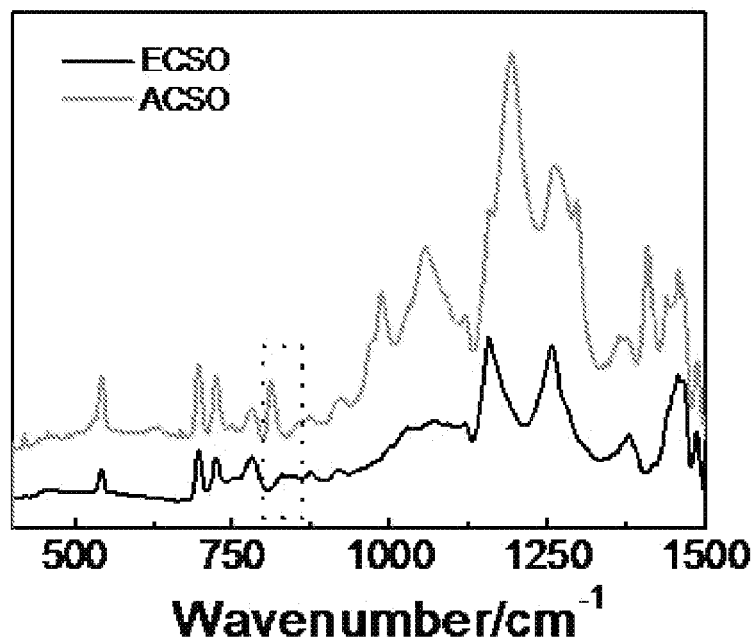
FIG. 13 shows the IR-Spectrum of CSBO and ECSBO.

The synthesized ACSO was characterized by FTIR as shown in FIG. 13. Epoxide bands appeared at 843 cm$^{-1}$ and 824 cm$^{-1}$ for ECSO but disappeared for ACSO. The spectrum of ACSO shows the absorption peaks at 810 cm$^{-1}$ (=CH), which illustrated that the acrylate C=C bond had been incorporated in the ECSO side chains.

$^1$H-NMR Analysis

Figure 14:
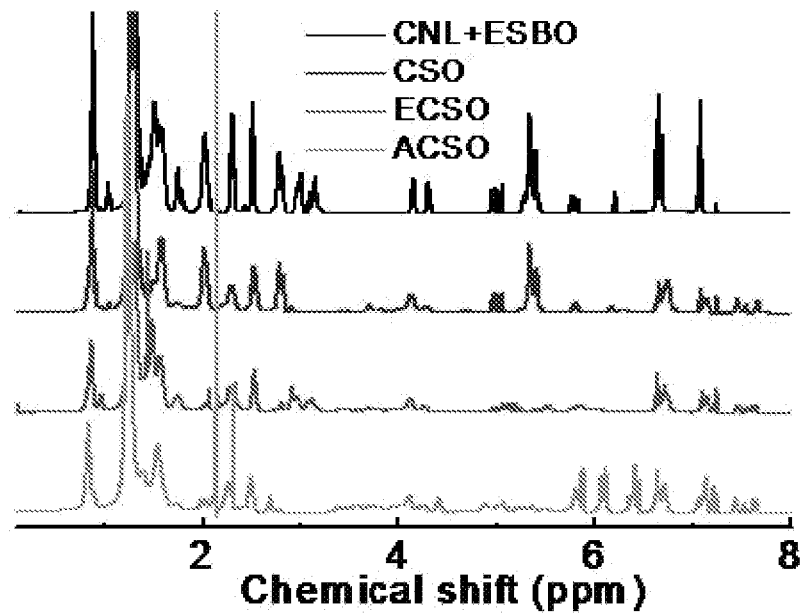
FIG. 14 shows the $^1$H-NMR spectrums of ACSO and its intermediates.

The $^1$H-NMR spectrum of ACSO and its intermediates are shown in FIG. 14. The $^1$H-NMR spectrum of CSO was assigned as following in ppm (CDCl$_3$): —CH3, 0.810-0.878; —C=C—CH$_2$—, 1.91-2.1; —CH=HC—, 5.22-5.46; aromatic protons, 6.61-6.78. Compared to the NMR for the mixture of CNSL and ESBO, the epoxy protons 2.94-3.19 ppm disappeared. Instrumental analysis data suggested that the graft reaction of ESBO and CNSL was finished.

The $^1$H-NMR spectrum of ECSO assigned as following in ppm (CDCl$_3$): —CH$_3$, 0.79-0.88; aromatic protons, 6.59-6.80, epoxy protons —CH—CH—, 2.85-3.19. Compared to the NMR of CSO, the epoxy proton signals appeared. And the olefinic protons at 5.29-5.48 and 1.91-2.1 disappeared. The results confirmed that the C=C double bonds were epoxidized to epoxy group completely.

The $^1$H-NMR spectrum of ACSO assigned as follows in ppm (CDCl$_3$): δ 5.91 and 6.43 ppm (CH2=), δ 6.1 ppm (=CH—C—), δ 6.6 and 7.1 ppm (—C—Ar—O—), δ 2.54 ppm (—Ar—CH$_2$—), δ 1.56 ppm (—Ar—C—CH$_2$—), δ 1.22 ppm (—C—CH$_2$—C—), δ 0.85 ppm (—CH$_3$). Compared to that of ECSO, the epoxide ring protons disappeared and C=C double bonds appeared, which illustrated that the acrylate C=C bond had been incorporated in the ECSO side chains.

Application of ACSO as Free Radical UV Curable Coating Materials

Biorenewable Content and UV Cured Film Mechanical Properties of ACSO

The biorenewable content and UV cured film mechanical properties of ACSO were listed in Table 1. As compared to AESO, though with higher biorenewable content, the mechanical properties of UV cured film based on ACSO including hardness, impact resistance and crosshatch adhesion were dramatically improved. This is due to the multi-branched architecture of ACSO, and multi-functionality and the rigidity of the aromatic ring from CNSL segments.

TABLE 1

The biorenewable content and mechanical properties of ACSO and AESO

|  | Biorenewable content (wt %) | Naturally derived carbon (wt. %) | Viscosity (cps) | Theoretical eq. wt. of C=C (g/mol) | Hardness (s) | Crosshatch adhesion (%) | 2 lb impact resistance (inch) |
|---|---|---|---|---|---|---|---|
| AESO | 70.5 | 81.2 | 9580 | 299.4 | 70 | 0 | 15 |
| ACSO | 76.5 | 87 | 41840 | 396.8 | 110 | 92 | 50 |

Photopolymerization Kinetics of ACSO and AESO

Figure 15:
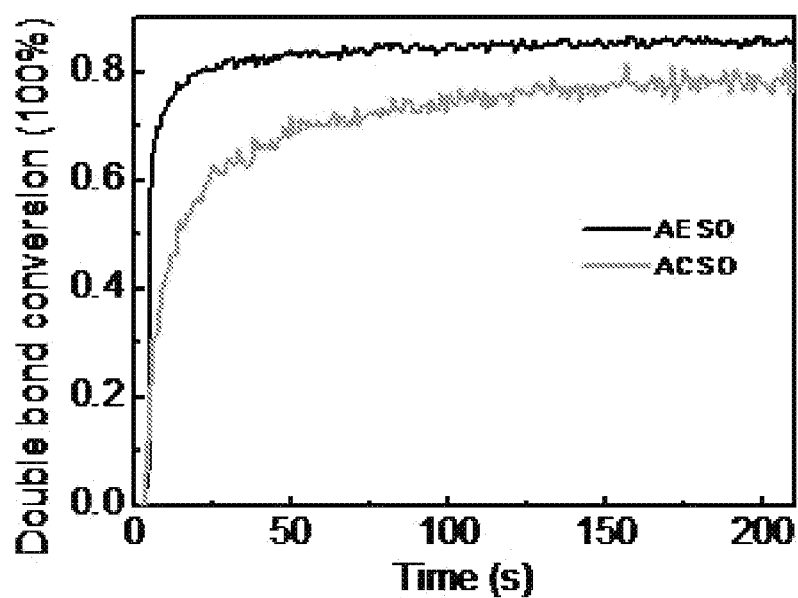
FIG. 15 shows a double bond conversion of AESO and ACSO versus irradiation time.

The double bond conversion profiles for the photopolymerization of AESO and ACSO are shown in FIG. 15. It can be seen that ACSO had a slower cure speed and lower degree of final double bond conversion as compared to AESO. It may be due to the lower concentration of double bonds in ACBO than AESO. Also, higher viscosity of ACSO resulted in lower functional group mobility during the photopolymerization process, thus lower final double bond conversion was observed. Formulating ACSO with reactive diluents will lower the formulation viscosity and enhance the double conversion.

DSC $T_g$ of UV cured ACSO and AESO

Figure 16:
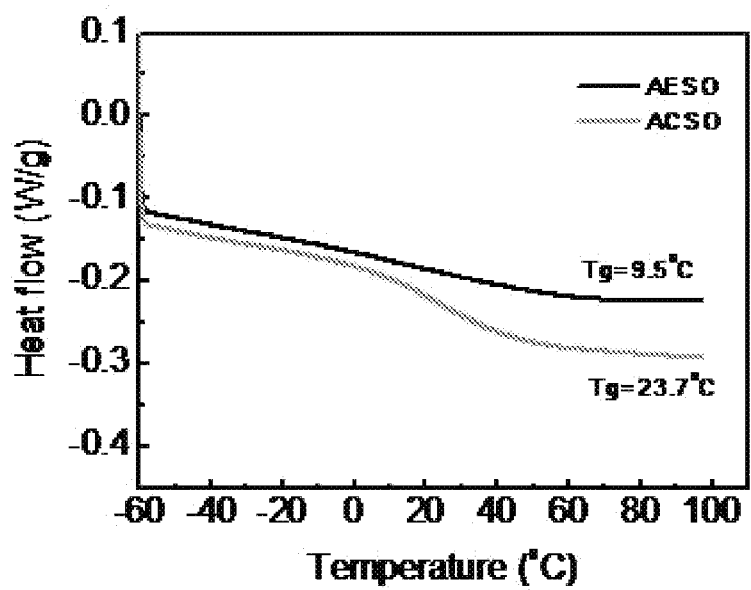
FIG. 16 shows DSC plots of UV cured films of AESO and ACSO.

DSC analysis results for UV cured AESO and ACSO are shown in FIG. 16. A higher $T_g$ was noted for UV cured ACSO (23.7° C.) as compared to AESO (9.5° C.). The significantly higher $T_g$ increment, as a result of the incorporated aromatic ring from CNSL and multi-branches structure of ACSO, has important practical application value in terms of material properties improvements. More importantly, the improvement of $T_g$ in ACSO was achieved without sacrificing biorenewable content, which meets our goal of molecular design.

Thermal Stability of ACSO and AESO

Figure 17:
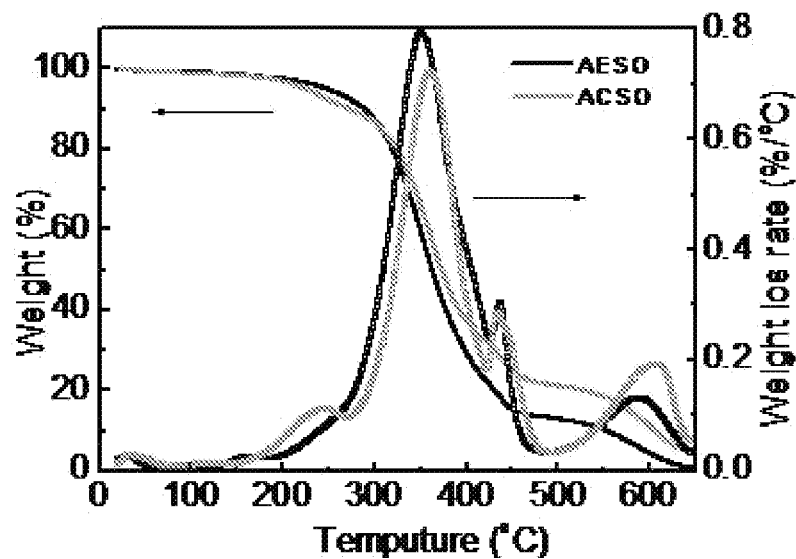
FIG. 17 shows TGA weight loss and weight loss rate curves of UV cured films of AESO and ACSO.

Comparative TGA studies of the thermal stability of AESO and ACSO were shown in FIG. 17. The ACSO film showed lower 10% weight loss temperature at 273° C. as compared with 288° C. of AESO. The probable reason is the thermal degradation of unreacted ACSO since it had lower double bond conversion than AESO. The UV cured ACSO film showed notable improvement of thermal stability after 300° C. compared to AESO. From the weight loss rate curves, it can be seen that the ACSO had higher major thermal degradation peak temperature at 363° C. compared to 350° C. for AESO. This improvement can be attributed to the CNSL segments which had higher heat resistance due to the inherent aromatic chemical structure.

Tensile Properties of UV Cured ACSO and AESO

Figure 18:
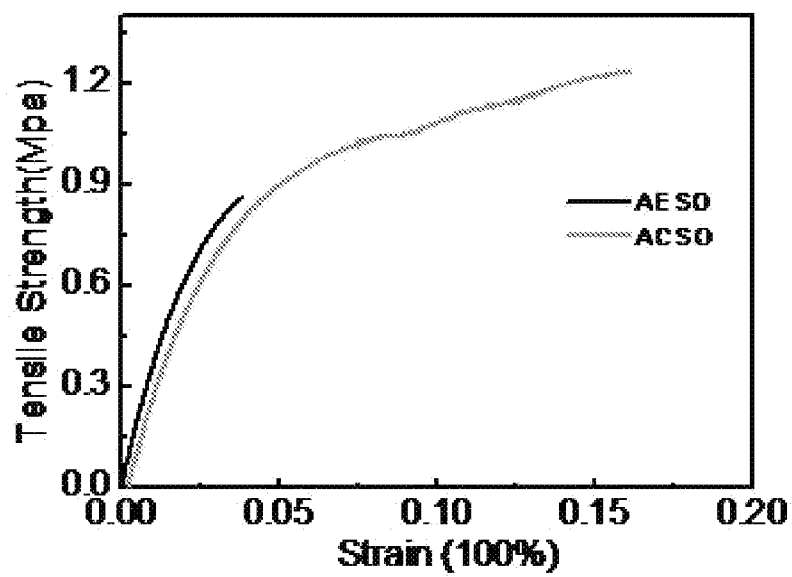
FIG. 18 shows stress-strain curves of final cured films of AESO and ACSO.

As shown in FIG. 18, the AESO film is weaker and less ductile because of its inherent "softness" and higher double bond concentration. On the other hand, the tensile strength and elongation at break of ACSO increased by 45% and 300% as compared to AESO film. The drastic improvement in film toughness (the area under the tensile strength-strain curve) of ASCO can be attributed to the combination of softness from the fatty acid chains and the hardness from the aromatic structures at molecular level, and the multi-functional and multi-branches structure of ACSO.

Application of ECSO as Cationic UV Curable Coating Materials

The Formulation and Mechanical Properties of ECSO and ESBO

The properties of ECSO were evaluated in cationic UV curable system and compared with ESBO. The formulation and UV cured film mechanical properties of were listed in Table 2. Besides pure ESBO and ECSO, 25 wt % of a petroleum based cycloaliphatic epoxy, UVR 6110, was formulated with ESBO or ECSO for better film properties. It was found that the ECSO based coatings had better compatibility with the cationic PI-UVI 6974, which is due to the better solubility/compatibility resulting from the multi-branched structure of ECSO. In addition, the mechanical properties of the UV cured films based on ECSO including crosshatch adhesion and impact had significant improvement compared with cured film based on ESBO. A relatively lower hardness of cured film based on ECSO was found, which was attributed to higher viscosity and the resultant lower conversion of the functional groups during photopolymerization. But when ECSO was formulated with UVR6110, similar hardness was achieved as compared to ESBO based counterpart.

TABLE 2

The formulation and mechanical properties of ECSO and ESBO

|  | ESBO100 | ESBO75 | ECSO100 | ECSO75 |
|---|---|---|---|---|
| ECSO |  |  | 100 | 75 |
| ESBO | 100 | 75 |  |  |
| UVR6110 | 0 | 25 | 0 | 25 |
| UVI 6974 | 5 | 5 | 5 | 5 |
| Appearance of liquid coatings | hazy | clear | clear | clear |
| Biorenewable content (wt. %) | 88.6 | 66.4 | 87.3 | 65.5 |
| Hardness (s) | 41 | 90 | 19 | 84 |
| Crosshatch adhesion (%) | 0 | 2 | 90 | 80 |
| 2 lb impact (inch) | 20 | 40 | 60 | 80 |

DSC $T_g$

Figure 19:
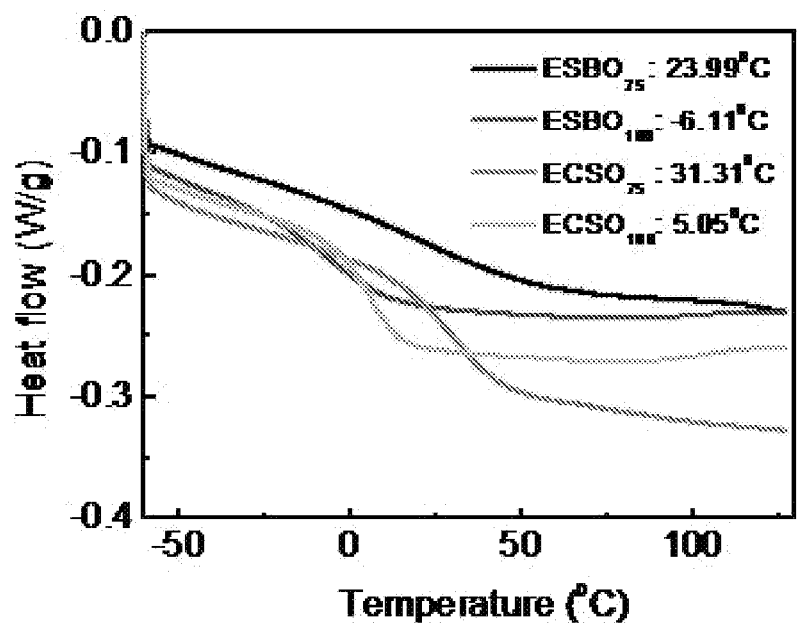
FIG. 19 shows DSC plots of UV cured films based on ESBO and ECSO.

DSC analysis results for cationic UV curable formulation based on ESBO and ECSO as listed in Table 2 are shown in FIG. 19, which shows a notable $T_g$ increase of UV cured films based on ECSO compared to ESBO. The $T_g$ of the 100% biorenewable resin formulation from −6.11° C. to 5.05° C., and the $T_g$ for the 25% UVR 6110 added formulations increased from 23.99° C. to 31.31° C. This increased $T_g$ was attributed to the aromatic ring structures in ECSO.

The Surface Morphology of ESBO and ECSO Based Films

Figure 20:
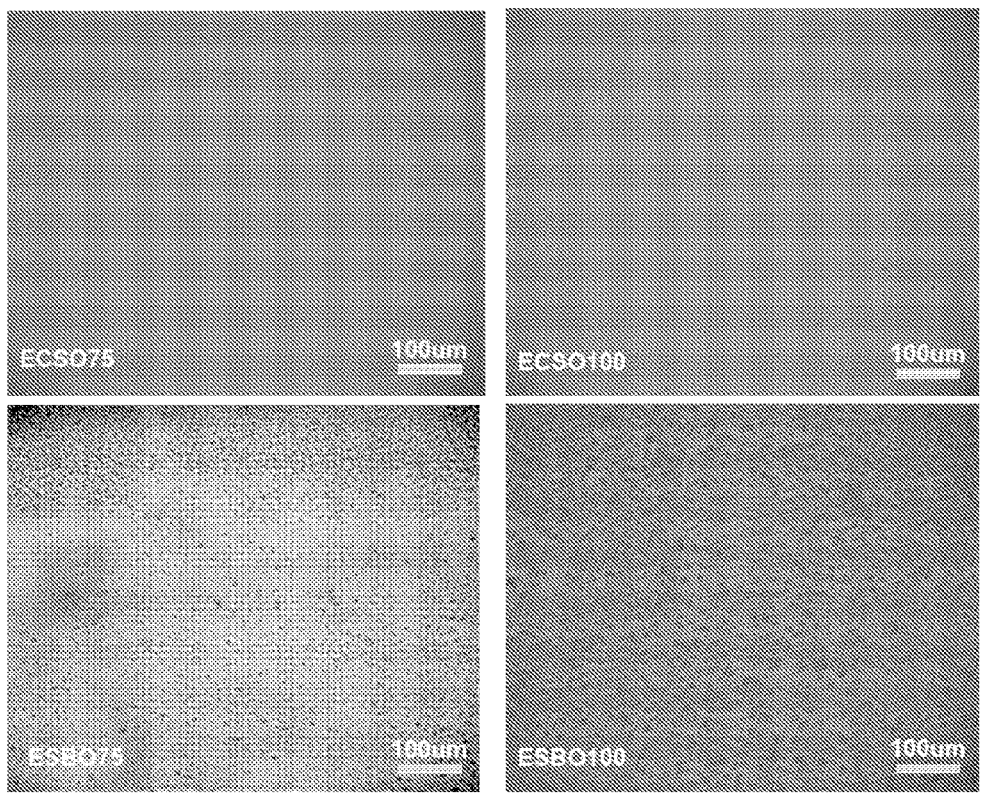
FIG. 20 shows optical microscopy images of UV cured films based on ESBO and ECSO.

As shown in FIG. 20, the surface morphology of final cured films based on ESBO and ECSO were examined by optical microscopy of Horiba Raman Spectrometer model HR800. Rough and heterogeneous surface of UV cured films based on ESBO can be seen, which may be due to photopolymerization shrinkage and the incompatibility of ESBO and the PI. On the other hand, smooth surface of films based on ECSO was observed, both in the pure and formulated ECSO based films. This is due to the better solubility/compatibility resulting from the multi-branched structure of ECSO.

Tensile Tests

Figure 21:
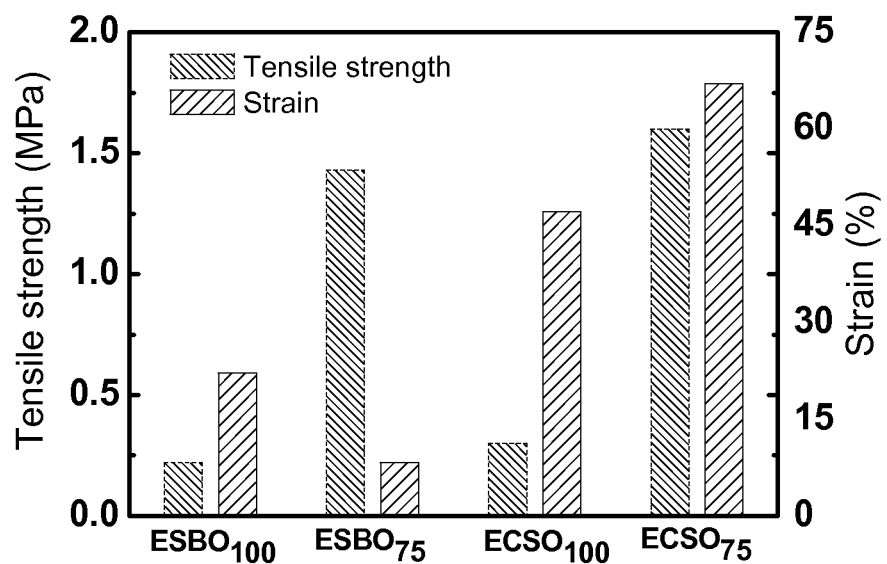
FIG. 21 shows tensile stress-strain curves of UV cured films based on ESBO and ECSO.

Tensile data are shown in FIG. 21. The cured films based on ECSO had a higher tensile strength and elongation compared to cured films based on ESBO. Interestingly, it was noticed that when formulated with UVR 6110, though much higher tensile strength were found for both ESBO and ECSO based films, only the ECSO based film also showed higher tensile strain improvement. In comparison, the ESBO+UVR 6110 film had even lower tensile strain value as compared to the pure ESBO film. The much better compatibility between the epoxidized plant oil ECSO and the petroleum based epoxy UVR 6110 as a result of the multi-branched structure of ECSO is considered as the key contributing factor in the tensile strain enhancement.

The complete disclosures of all patents, patent applications including provisional patent applications, and publications, and electronically available material cited herein are incorporated by reference. The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

What is claimed is:

1. A hyperbranched oligomer comprising:
   a hyperbranched core; and
   a cashew nutshell oil or liquid component;

wherein the cashew nutshell oil or liquid component comprises a phenol group, and wherein the hyperbranched core is covalently linked to the cashew nutshell oil or liquid component through the phenolic hydroxyl.

2. The hyperbranched oligomer of claim 1 further comprising a linking segment disposed between the core and the cashew nutshell oil or liquid component.

3. The hyperbranched oligomer of claim 2, wherein the linking segment comprises a diester.

4. The hyperbranched oligomer of claim 1 wherein the hyperbranched core has a dendritic structure.

5. The hyperbranched oligomer of claim 1 wherein the hyperbranched core comprises a polyol.

6. The hyperbranched oligomer of claim 1 which is epoxidized.

7. The hyperbranched oligomer of claim 1 which is acrylated.

8. The hyperbranched oligomer of claim 1 wherein the cashew nutshell oil or liquid component further comprises an unsaturated aliphatic side chain.

9. The hyperbranched oligomer of claim 1 wherein the cashew nutshell oil or liquid component comprises a cardanol.

10. The hyperbranched oligomer of claim 9 wherein the cardanol comprises an epoxidized cardanol.

11. A method for making the hyperbranched oligomer of claim 1 comprising:
    reacting a polyol with an anhydride to yield a polycarboxylic acid; and
    reacting the polycarboxylic acid with an activated cashew nutshell oil or liquid component to yield a hyperbranched oligomer comprising a plurality of branches comprising a component of the cashew nutshell oil or liquid.

12. The method of claim 11 wherein the activated cashew nutshell oil or liquid component comprises an epoxy group at the site of the phenolic hydroxyl.

13. The method of claim 11 wherein the polyol comprised a dendritic polyester polyol or a dendritic polyether polyol.

14. The method of claim 11 wherein reacting the polycarboxylic acid with the activated cashew nutshell oil or liquid component takes place in the absence of a solvent.

15. A hyperbranched oligomer prepared using the method of claim 11.

16. A method for making a functionalized hyperbranched oligomer comprising:
    reacting the hyperbranched oligomer of claim 1 with an oxidizing acid to yield an epoxidized hyperbranched oligomer.

17. A method for making a functionalized hyperbranched oligomer comprising:
    reacting the epoxidized hyperbranched oligomer of claim 6 with an acrylic acid to yield an acrylated hyperbranched oligomer.

18. An oil, lubricant, coating, adhesive, resin or composite comprising the hyperbranched oligomer of claim 1.

19. An article or surface comprising the coating of claim 18.

20. The article or surface of claim 19, comprising wood, metal, paper and/or plastic.

21. A composition or formulation comprising the hyperbranched oligomer of claim 1 and at least one additional component selected from the group consisting of a photoinitiator, an adhesion promoter and a reactive diluent.

* * * * *